(12) United States Patent  
Chastain et al.

(10) Patent No.: US 8,802,048 B2  
(45) Date of Patent: Aug. 12, 2014

(54) METHODS OF PROCESSING SOLUTIONS OF POTASSIUM SULFATE AND MAGNESIUM SULFATE, METHODS OF PRODUCING POTASSIUM SULFATE, AND RELATED SYSTEMS

(71) Applicant: Intercontinental Potash Corporation, Hobbs, NM (US)

(72) Inventors: Steven L. Chastain, Wichita, KS (US); Michael J. Morrison, Golden, CO (US); Richard W. Chastain, Carlsbad, NM (US); Donial M. Felton, Carlsbad, NM (US); Thomas H. Neuman, Salt Lake City, UT (US)

(73) Assignee: Intercontinental Potash Corp. (USA), Hobbs, NM (US)

( * ) Notice: Subject to any disclaimer, the term of this patent is extended or adjusted under 35 U.S.C. 154(b) by 0 days.

(21) Appl. No.: 14/023,347

(22) Filed: Sep. 10, 2013

(65) Prior Publication Data

US 2014/0072507 A1 Mar. 13, 2014

Related U.S. Application Data

(60) Provisional application No. 61/699,917, filed on Sep. 12, 2012.

(51) Int. Cl.
  *C01D 5/00* (2006.01)
  *C01D 5/16* (2006.01)
  *B01D 9/02* (2006.01)
  *B01D 9/00* (2006.01)

(52) U.S. Cl.
  CPC .. *C01D 5/00* (2013.01); *C01D 5/16* (2013.01); *B01D 9/02* (2013.01); *B01D 9/0036* (2013.01)
  USPC ........................................ 423/551; 422/245.1

(58) Field of Classification Search
  CPC .............. C01D 5/16; C01D 5/00; B01D 9/02; B01D 9/0036
  USPC ........................................ 423/551; 422/245.1
  See application file for complete search history.

(56) References Cited

U.S. PATENT DOCUMENTS 1,794,552 A    3/1931  Schoch
1,812,497 A    6/1931  Fletcher
(Continued)

FOREIGN PATENT DOCUMENTS

GB    1183938    3/1970
WO    2010150267 A1    12/2010

OTHER PUBLICATIONS

Conley et al., "Potash Salt from Texas-New Mexico Polyhalite Deposits: Commercial Possibilities, Proposed Technology, and Pertinent Salt Solution Equilibria," U.S. Dept. of the Interior, Bulletin 459, Washington, DC, 1944, pp. i-251.

(Continued)

*Primary Examiner* — Timothy Vanoy
(74) *Attorney, Agent, or Firm* — TraskBritt

(57) ABSTRACT

Methods of processing an aqueous solution comprising potassium sulfate and magnesium sulfate include crystallizing $K_2SO_4$, crystallizing recycle crystals, and mixing at least a portion of the recycle crystals with the aqueous solution. Systems for processing potassium sulfate and magnesium sulfate include a first crystallizer and a second crystallizer in fluid communication with the second mix tank. The second crystallizer is structured and adapted to precipitate recycle crystals from the concentrated liquor to form a potassium-depleted recycle brine. The recycle crystals precipitated in the second crystallizer have a composition suitable to be recycled to the first crystallizer to increase the production of SOP.

23 Claims, 13 Drawing Sheets

(56) References Cited

U.S. PATENT DOCUMENTS

| | | | |
|---|---|---|---|
| 1,924,519 | A | 8/1933 | Schoch |
| 1,939,174 | A * | 12/1933 | Kaselitz ......................... 423/551 |
| 1,952,289 | A | 3/1934 | Schoch |
| 2,020,322 | A | 11/1935 | Lambert |
| 2,033,149 | A | 3/1936 | Partridge |
| 2,679,489 | A | 11/1956 | Eckstrom |
| 2,862,788 | A | 12/1958 | Stanley, Jr. et al. |
| 2,895,794 | A | 7/1959 | Dancy, Jr. et al. |
| 2,902,334 | A | 9/1959 | Milne |
| 2,991,154 | A * | 7/1961 | Patzias ......................... 423/195 |
| 3,004,826 | A | 10/1961 | Marullo et al. |
| 3,058,806 | A | 10/1962 | Ebner |
| 3,110,561 | A | 11/1963 | Henne et al. |
| 3,203,757 | A | 8/1965 | Henne et al. |
| 3,271,106 | A | 9/1966 | Nylander |
| 3,285,025 | A * | 11/1966 | Shaul ............................. 62/541 |
| 3,396,086 | A | 8/1968 | Starmer |
| 3,475,132 | A | 10/1969 | Seifert et al. |
| 3,528,767 | A | 9/1970 | Garrett |
| 3,547,597 | A * | 12/1970 | Hays ............................. 23/302 T |
| 3,617,243 | A | 11/1971 | Neitzel |
| 3,630,713 | A | 12/1971 | Adams et al. |
| 3,634,041 | A | 1/1972 | Ryan et al. |
| 3,843,772 | A | 10/1974 | Boeglin |
| 3,926,609 | A | 12/1975 | Effmert et al. |
| 3,998,935 | A | 12/1976 | Adams et al. |
| 4,026,696 | A | 5/1977 | Young et al. |
| 4,045,335 | A | 8/1977 | Adams et al. |
| 4,183,738 | A | 1/1980 | Carmon |
| 4,246,019 | A | 1/1981 | Sokolov et al. |
| 4,277,253 | A | 7/1981 | Walter et al. |
| 4,303,468 | A | 12/1981 | Laguilharre et al. |
| 4,306,880 | A | 12/1981 | Garrett |
| 4,334,885 | A | 6/1982 | Harrison et al. |
| 4,500,336 | A | 2/1985 | Van Hijfte et al. |
| 4,533,536 | A | 8/1985 | Bichara et al. |
| 4,554,151 | A | 11/1985 | Worthington et al. |
| 4,815,790 | A | 3/1989 | Rosar |
| 5,057,208 | A | 10/1991 | Hagedorn et al. |
| 5,078,779 | A | 1/1992 | Van de Walle et al. |
| 5,102,441 | A | 4/1992 | Zentgraf et al. |
| 5,246,273 | A | 9/1993 | Rosar |
| 5,298,050 | A * | 3/1994 | McLaughlin et al. ............ 71/63 |
| 6,013,209 | A | 1/2000 | Phinney |
| 6,143,271 | A | 11/2000 | Holdengraber et al. |
| 6,582,637 | B1 | 6/2003 | Phinney |
| 6,709,685 | B1 | 3/2004 | van Brempt et al. |
| 7,604,792 | B2 | 10/2009 | Fairchild |
| 2006/0032114 | A1 | 2/2006 | Krysiak et al. |
| 2006/0226051 | A1 | 10/2006 | Navarrette et al. |
| 2010/0031719 | A1 | 2/2010 | Hero et al. |
| 2010/0066153 | A1 | 3/2010 | Day et al. |
| 2013/0121900 | A1 * | 5/2013 | Neuman et al. ................ 423/199 |
| 2014/0072507 | A1 * | 3/2014 | Chastain et al. ............... 423/551 |

OTHER PUBLICATIONS

Felton et al., "Producing Sulfate of Potash from Polyhalite with Cost Estimates," Gustavson Associates, Mar. 23, 2010, pp. 1-19.

Fragen et al., "Extraction of Potash from Polyhalite," Industrial and Engineering Chemistry, Oct. 1933, vol. 25, No. 10, pp. 1153-1160.

Wollmann et al., "Heat of solution of polyhalite and its analogues at T=298.15 K," J. Chem. Thermodynamics, 41 (2009) 484-488.

International Search Report and Written Opinion of the International Search Authority for PCT/US2013/059040, mailed Dec. 4, 2013, 10 pages.

* cited by examiner

METHODS OF PROCESSING SOLUTIONS OF POTASSIUM SULFATE AND MAGNESIUM SULFATE, METHODS OF PRODUCING POTASSIUM SULFATE, AND RELATED SYSTEMS

CROSS-REFERENCE TO RELATED APPLICATION

This application claims the benefit of U.S. Provisional Patent Application Ser. No. 61/699,917, filed Sep. 12, 2012, in the name of Chastain et al., the disclosure of which is hereby incorporated herein in its entirety by this reference.

FIELD

The present disclosure relates generally to processing aqueous solutions of alkali-metal and alkaline-earth-metal complexes to produce sulfate of potash, langbeinite, and/or other alkali-metal- and alkaline-earth-metal-containing products.

BACKGROUND

Polyhalite is a mineral having the formula $K_2Ca_2Mg(SO_4)_4.2H_2O$, which occurs naturally in, for example, deposits in Texas, New Mexico, Ukraine, and Germany. Ore deposits are conventionally sub-surface mined to produce ore in rock or chunk form because polyhalite is not sufficiently water-soluble to allow ore deposits to be economically solution-mined.

Polyhalite may be used in the production of various salts, such as potassium sulfate (also known as sulfate of potash or SOP), potassium magnesium sulfate, potassium calcium sulfate, potassium hydroxide, magnesium sulfate, etc. Some potassium salts are important ingredients in fertilizers and feedstocks for various industrial processes.

Polyhalite is soluble or leachable in aqueous solutions without calcining (i.e., heating to a temperature at which the polyhalite at least partially dissociates), but dissolution is relatively slow. Several methods of processing polyhalite ores are known, such as those described in John E. Conley and Everett P. Partridge, "Potash Salt from Texas-New Mexico Polyhalite Deposits Commercial Possibilities, Proposed Technology, and Pertinent Salt-Solution Equilibria," U.S. Dept. of the Interior Bureau of Mines Bulletin 459 (1944), which is incorporated herein in its entirety by this reference. For example, polyhalite may be calcined by methods known in the art, and $K_2SO_4$ and $MgSO_4$ may be extracted by hot water, cold water, or other methods. The resulting liquor may be subjected to various processes in order to yield products such as potassium sulfate (SOP or $K_2SO_4$), leonite ($K_2SO_4MgSO_4.4H_2O$), schoenite ($K_2SO_4MgSO_4.6H_2O$), langbeinite ($K_2SO_4.2MgSO_4$), kieserite ($MgSO_4.H_2O$), epsomite ($MgSO_4.7H_2O$), etc.

Known methods of processing polyhalite ores generally require significant power and/or steam inputs, and may have process limitations. For example, in some processes, $K_2SO_4$ may be recovered with an efficiency of about 86%, but may not be in the form conventionally used as fertilizer (e.g., crystalline form, purity, etc.). In some processes, potassium may be produced entirely as SOP, but the efficiency may be only about 74%, and steam and power requirements may be relatively higher. In still other processes, $K_2SO_4$ efficiency may be as high as 95%, but with higher steam and power requirements. Some processes may yield sulfate-containing products in less-than-ideal ratios (i.e., in ratios that do not maximize economic value of products). It would therefore be advantageous to provide a method of processing polyhalite that minimizes or alleviates these shortcomings.

BRIEF SUMMARY

In some embodiments, a method of processing an aqueous solution containing potassium sulfate and magnesium sulfate includes mixing recycle crystals with the aqueous solution, crystallizing potassium sulfate, and crystallizing the recycle crystals. The recycle crystals may include leonite and/or schoenite, and, optionally, potassium sulfate.

Other methods of processing a leach brine containing potassium sulfate and magnesium sulfate include mixing recycle crystals with the leach brine, crystallizing potassium sulfate from the concentrated solution to form a first potassium-depleted liquor, crystallizing the recycle crystals from the first potassium-depleted liquor to form a second potassium-depleted liquor, and crystallizing langbeinite from the second potassium-depleted liquor. The recycle crystals can be leonite or a mixture of leonite, schoenite, and optionally, potassium sulfate. Recycle crystals may also include other materials, such as calcium-containing salts.

Some systems for processing potassium sulfate and magnesium sulfate brines disclosed herein include a first crystallizer and a second crystallizer in fluid communication with the first crystallizer. The first crystallizer is structured and adapted to precipitate potassium sulfate from a concentrated liquor. The second crystallizer is structured and adapted to precipitate recycle crystals from the concentrated liquor to form a potassium-depleted recycle brine. The recycle crystals precipitated in the second crystallizer have a composition suitable to be recycled to the first crystallizer to increase the production of SOP.

In some embodiments, a process for producing potassium sulfate from a raw polyhalite ore includes: calcining solid particles of polyhalite to convert at least a portion of the solid particles of polyhalite to a water-soluble composition of compounds containing $Ca^{2+}$, $Mg^{2+}$, $K^+$, and $SO_4^{2-}$; dissolving the water-soluble composition within a leaching circuit to form a solution, producing an extract liquor having a molar ratio of $K_2SO_4$ to $MgSO_4$ of about 1:1; adding recycle crystals comprising at least one of leonite and potassium sulfate to the extract liquor to produce an intermediate solution having a higher concentration of $K_2SO_4$ and $MgSO_4$ than the extract liquor; evaporating water from the concentrated solution under conditions adapted to produce a first evaporate solution having $K_2SO_4$ and $MgSO_4$ concentrations higher than the concentrated solution and to precipitate a calcium-containing salt therefrom in a first evaporation step; separating the calcium-containing salt from the first evaporate solution to produce an ultra-concentrated filtrate solution comprising $K_2SO_4$ and $MgSO_4$ having a higher concentration of these ions than the concentrated solution; evaporating sufficient water from the ultra-concentrated solution to produce crystals of potassium sulfate and a second evaporate solution in a second evaporation step; separating the crystals of potassium sulfate from the second evaporate solution to provide a potassium-sulfate product; evaporating sufficient water from the second evaporate solution to produce crystals including at least one of leonite and $K_2SO_4$ and a third evaporate solution in a third evaporation step; and recycling the crystals of leonite or leonite and $K_2SO_4$ to the second evaporation step. Recycle crystals may also include other materials, such as schoenite.

DETAILED DESCRIPTION

Novel systems and processes for processing aqueous media derived from a naturally occurring ore comprising potassium sulfate and magnesium sulfate in various combinations and concentrations are described herein. The processes may include, for example, steps for concentration, crystallization, and physical separation (e.g., decantation, filtration, etc.), as described in further detail below. The processes generally include crystallization of various types of solutions to recover SOP, leonite and/or schoenite in a selective manner, and optionally, recovery of langbeinite. Some materials are recycled in certain processes to enhance product recovery, provide energy efficiencies, etc. Some processes include parallel operations to improve process flexibility, stability, or economics. Illustrations presented herein are representations employed to describe embodiments of the present disclosure.

As used herein, particular mineral names (e.g., polyhalite, leonite, langbeinite, etc.) may refer to as-mined minerals, minerals physically or chemically separated from as-mined minerals, or crystallized solids formed (e.g., crystallized) in industrial processes. Particular minerals described herein may be substantially pure or may be mixed with other materials or contaminants.

As used herein, the terms "multiple-effect evaporator" and "MEE" each mean and include a series or plurality of vessels (or "effects") operable to boil a portion of a liquid at elevated pressure, ambient pressure, or reduced pressure (vacuum). Heat extracted from one vessel may be transferred to another vessel. Multiple-effect evaporators are described in, for example, U.S. Pat. No. 2,769,489, issued Nov. 6, 1956, and entitled "Multiple Effect Evaporator," the disclosure of which is incorporated herein in its entirety by this reference.

As used herein, the terms "mechanical vapor recompression evaporator" and "MVR evaporator" each mean and include a vessel coupled to a blower or compressor operable to compress vapor from the vessel. The blower or compressor operates as the energy input to boil a portion of a liquid in the vessel. Mechanical vapor recompression evaporators are described in, for example, U.S. Pat. No. 4,303,468, issued Dec. 1, 1981, and entitled "Mechanical Vapor Recompression Evaporators," and U.S. Pat. No. 3,396,086, issued Aug. 6, 1968, and entitled "Recompression Evaporators," the disclosure of each of which is incorporated herein in its entirety by this reference. MVR evaporators may be powered by a variable-frequency drive, which may allow operation over a wide power range.

Figure 1:
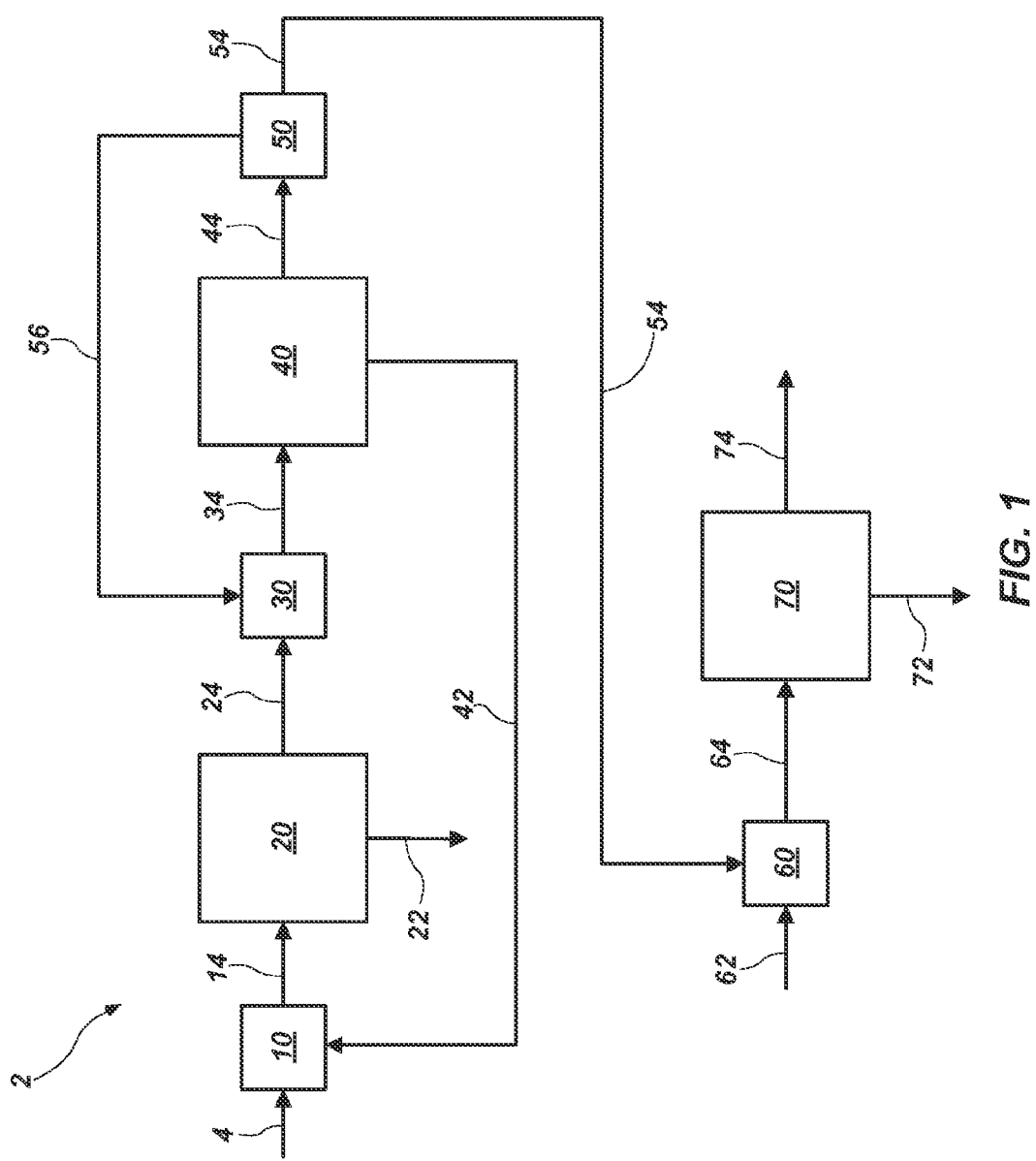
FIGS. 1 through 13 are simplified block flow diagrams illustrating embodiments of systems and processes for producing SOP, recycle crystals, and langbeinite from an aqueous solution comprising potassium sulfate and magnesium sulfate.

A system for processing an aqueous medium comprising potassium sulfate and magnesium sulfate (system 2) is shown schematically in FIG. 1. To simplify the figures and clarify the present disclosure, not every element or component of system 2 is shown or described herein. System 2 may also include appropriate piping, connectors, sensors, controllers, etc., as will be understood by those of ordinary skill in the art. System 2, as illustrated, includes a first mixing apparatus 10 for mixing a leach brine 4 with a recycle stream 42. This leach brine 4 includes an aqueous medium containing dissolved and/or suspended species extracted from polyhalite ore. The recycle stream 42 typically includes predominantly solid potassium sulfate and magnesium sulfate. For example, the recycle stream 42 generally has a molar ratio of potassium sulfate to magnesium sulfate of at least about 1:1, such as up to about 1.6:1. The recycle stream 42 typically includes leonite and/or schoenite crystals, and may also include SOP. The recycle stream 42 formed within system 2 is described in further detail below. The leach brine 4 may be mixed with the recycle stream 42 to form a concentrated brine 14 that is more concentrated in potassium and magnesium than the leach brine 4. The concentrated leach brine 14 may optionally include small amounts of undissolved solids.

The leach brine 4 may be formed, for example, as described in U.S. Patent Application Publication No. 2013/0121900, published May 16, 2013, and entitled "Methods of Processing Polyhalite Ore, Methods of Producing Potassium Sulfate, and Related Systems," the disclosure of which is incorporated herein in its entirety by this reference. For example, a polyhalite ore is crushed, washed, and calcined. Calcination is described in John E. Conley and Everett P. Partridge, "Potash Salt from Texas-New Mexico Polyhalite Deposits: Commercial Possibilities, Proposed Technology, and Pertinent Salt-Solution Equilibria," U.S. Dept. of the Interior Bureau of Mines Bulletin 459 (1944), previously incorporated by reference. Potassium and magnesium salts, when leached from the calcined polyhalite, form the leach brine 4. Additional potassium-containing compounds may optionally be added to the leach brine 4 to increase recovery of potassium as SOP, as described herein. Some impurities from the polyhalite ore may be removed from the leach brine 4 before the leach brine 4 enters the system 2. For example, calcium sulfate or other impurities may be removed to prevent crystallization of these salts and fouling of the system 2. In some embodiments, some impurities that could be removed are allowed to remain in the leach brine 4 for economic or other reasons. For example, product specifications may allow some impurities to remain in an end product, and removal of those impurities may not increase the value of the end product.

In some embodiments, solid particles of polyhalite calcined for a sufficient period of time to convert at least partially to a water-soluble composition of $Ca^{2+}$, $Mg^{2+}$, $K^+$, and $SO_4^{2-}$ may be leached in an aqueous medium to form an extract liquor having a molar ratio of $K_2SO_4$ to $MgSO_4$ of about 1:1. Recycle crystals produced later in the process are introduced to the extract liquor to produce a more concentrated solution comprising $K_2SO_4$ and $MgSO_4$. Water evaporated from the concentrated solution under appropriate conditions produces an evaporate solution having $K_2SO_4$ and $MgSO_4$ concentrations higher than the feed solution and eventually precipitates SOP ($K_2SO_4$) in a crystallization step.

The first mixing apparatus 10, when held at a temperature from about 70° C. to about 130° C., promotes the dissolution of recycle crystals. For example, the first mixing apparatus 10 may operate at a temperature of about 80° C. Increasing the concentration of the concentrated brine 14 by adding the recycle stream 42 may increase the production rate of valuable products, such as SOP.

The concentrated brine 14 may optionally enter an evaporator (not shown in FIG. 1) to further increase the concentration of potassium, magnesium, and sulfate ions. Such an evaporator may be, for example, a mechanical vapor recompression (MVR) evaporator operable to remove from about 10 wt % to about 50 wt %, from about 20 wt % to about 40 wt %, or from about 25 wt % to about 35 wt % of the water from the concentrated brine 14. In a typical operation, the evaporator removes about 30 wt % of the water from the concentrated brine 14. The evaporator operates generally at temperatures from about 80° C. to about 110° C., such as from about 95° C. to about 100° C. The evaporator may be integral to a subsequent operation, such as an SOP crystallizer 20, described below.

The concentrated brine 14 enters the SOP crystallizer 20, which is operable to crystallize SOP 22 (i.e., $K_2SO_4$) from the concentrated brine 14. The SOP crystallizer 20 may include an MVR evaporator, an MEE, any combination thereof, or any other apparatus operable to promote crystallization of dissolved species. The SOP crystallizer 20 may operate, for example, at a temperature in a range from about 40° C. to about 100° C., such as in a range from about 70° C. to about 90° C. The SOP 22 produced is further processed by filtering, washing, drying, agglomerating (e.g., granulating or compacting) etc., as necessary to produce fertilizer-grade $K_2SO_4$, soluble-grade $K_2SO_4$, or another selected grade of $K_2SO_4$. Upon removal of the crystallized SOP 22, remaining liquor 24 is transferred to a second mixing apparatus 30, where the liquor 24 may optionally be mixed with a portion 56 of a potassium-depleted brine 44 to form an enriched liquor 34.

The enriched liquor 34 enters a recycle crystallizer 40 operable to form recycle crystals and produce recycle stream 42 from the enriched liquor 34, forming a potassium-depleted brine 44. The recycle crystallizer 40 may include an MVR evaporator, an MEE, any combination thereof, or any other apparatus operable to promote crystallization of dissolved species. In some embodiments, the recycle crystallizer 40 includes stages of an MEE, and the recycle crystallizer 40 may be a continuation of an MEE that includes the SOP crystallizer 20 (i.e., some stages of an MEE are included in the SOP crystallizer 20, and some are included in the recycle crystallizer 40). The recycle crystallizer 40 may operate, for example, at a temperature in a range from about 40° C. to about 80° C., such as in a range from about 50° C. to about 70° C.

The potassium-depleted brine 44 may be separated into two portions 54, 56 in a splitting device 50 (e.g., a valve, a tank, etc.). One portion 56, if split, recycles to the second mixing apparatus 30, as described above. Alternatively, the portion 56 may be recycled to another location, such as to the first mixing apparatus 10 or to a point within the recycle crystallizer 40 (e.g., between MEE stages). The other portion 54 enters a third mixing apparatus 60, where it mixes with SOP 62 to form a magnesium- and potassium-rich liquor 64. The SOP 62 may be a portion of the SOP 22 framed in the SOP crystallizer 20, or may be SOP from another source. In some embodiments, the SOP 62 may be a liquid, suspension, or hydrated form of $K_2SO_4$, or may include other materials.

The magnesium- and potassium-rich liquor 64 enters a langbeinite crystallizer 70 operable to crystallize langbeinite 72 from the magnesium- and potassium-rich liquor 64. A purge stream 74 removes uncrystallized ions from the system 2. Optionally, the langbeinite crystallizer 70 may be decoupled from the rest of the system 2 (e.g., from the SOP crystallizer 20, the recycle crystallizer 40, and the mixing apparatuses 10 and 30). Such decoupling allows the amount of langbeinite 72 produced to vary, such as to maximize economic output of the system 2, while maintaining many operating parameters. Since formation of langbeinite 72 decreases the amount of SOP 22 available for sale (i.e., because some SOP 62 is used as an input), market conditions may suggest making less langbeinite 72 than is theoretically possible. That is, the purge stream 74 may include a concentration of magnesium ions that could be recovered, but that is profitably treated for disposal instead (e.g., because the SOP needed to convert the magnesium ions to langbeinite is more valuable than the langbeinite that could be produced). In some embodiments, the purge stream 74 is used to produce epsomite, kieserite, or some other material. In some embodiments, the third mixing apparatus 60 may be omitted or bypassed, and SOP 62 may not be added to the portion 54 of the potassium-depleted brine 44. In such embodiments, the portion 54 of the potassium-depleted brine 44 may form epsomite, kieserite, or some other material in the langbeinite crystallizer 70 (i.e., instead of or in addition to langbeinite). In some embodiments, a portion or all of the recycle stream 42 may be diverted for sale or use as a separate product. Such diversion would alter the product mix and/or the product yield, but may be beneficial under some economic conditions.

In some embodiments, other salts may be removed within the system 2. For example, calcium may be precipitated as calcium sulfate ($CaSO_4$) or as polyhalite before the first mixing apparatus 10, the SOP crystallizer 20, the second mixing apparatus 30, the recycle crystallizer 40, the third mixing apparatus 60, and/or the langbeinite crystallizer 70. The solubility of calcium sulfate in aqueous solutions decreases with increasing temperature, so calcium removal may limit or prevent problems associated with fouling (e.g., decreased efficiency, increased maintenance expenses, etc.). Calcium precipitates may be separated from other products, such as by differences in particle size or by density.

Figure 2:
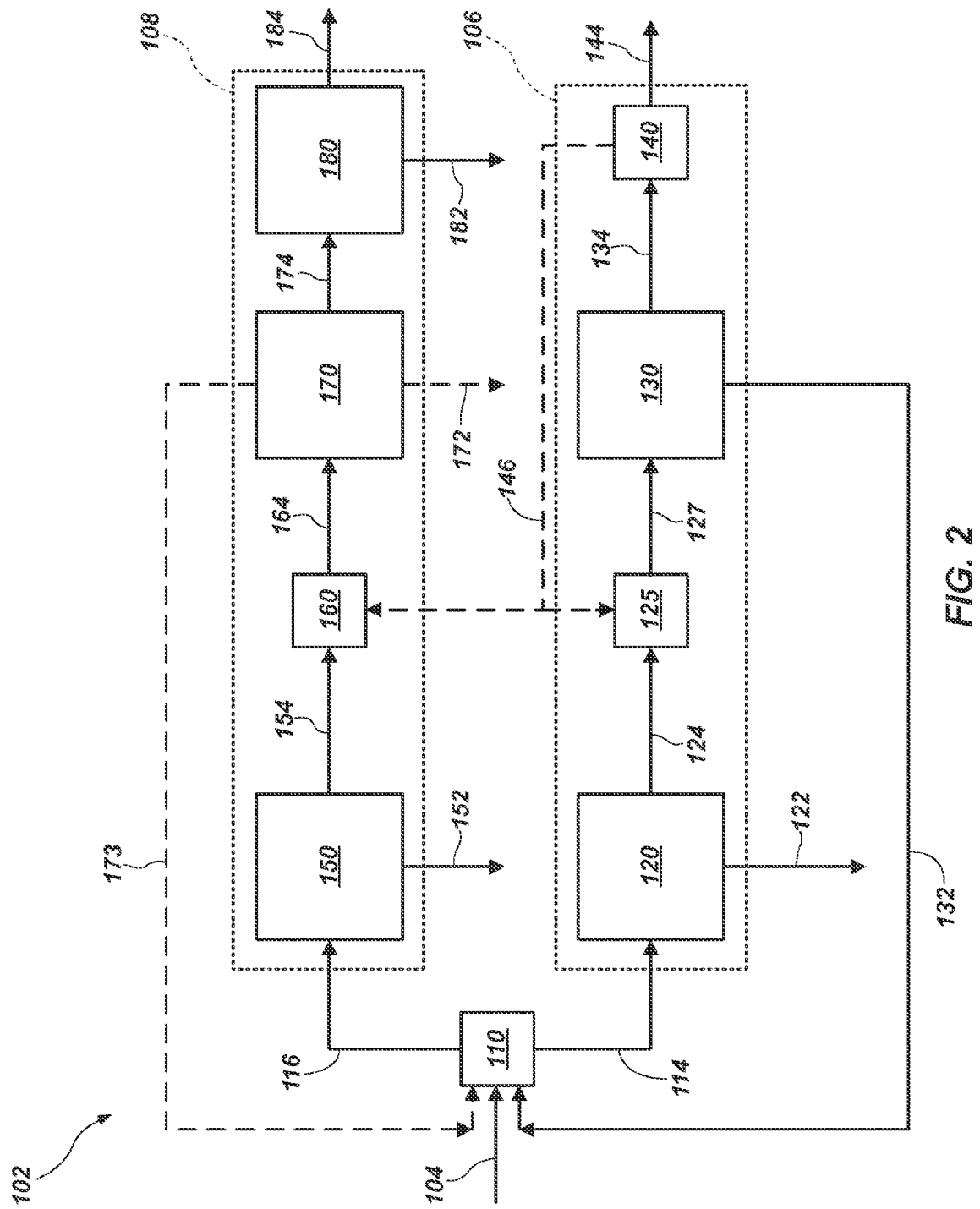

Another system 102 for processing an aqueous medium comprising potassium sulfate and magnesium sulfate is shown schematically in FIG. 2. System 102 includes a first mixing apparatus 110 for mixing a leach brine 104 with one or more recycle streams 132, 173. For example, the leach brine 104 may include an aqueous medium containing dissolved and/or suspended species extracted from polyhalite ore. The recycle streams 132, 173 include solid crystals primarily composed of potassium sulfate and magnesium sulfate (e.g., as leonite, schoenite, etc.), such as the recycle stream 42 described above. The leach brine 104 is mixed with the recycle streams 132, 173 to form concentrated brines 114, 116, which are more concentrated in potassium and magnesium than the leach brine 104. The concentrated leach brines 114, 116 may optionally include small amounts of undissolved solids.

The first mixing apparatus 110, when held at a temperature from about 70° C. to about 130° C., promotes the dissolution of recycle crystals. For example, the first mixing apparatus 110 may operate at a temperature of about 80° C. Increasing the concentration of the concentrated brine 114, 116 by adding the recycle streams 132, 173 may increase the production rate of valuable products, such as SOP.

The concentrated brine 114, 116 may enter one or more evaporators (not shown in FIG. 2) to further increase the concentration of potassium, magnesium, and sulfate ions. The evaporators may include, for example, a mechanical vapor recompression (MVR) evaporator operable to remove from about 10 wt % to about 50 wt %, from about 20 wt % to about 40 wt %, or from about 25 wt % to about 35 wt % of the water from the concentrated brine 114, 116. In some embodiments, the evaporators remove about 30 wt % of the water from the concentrated brine 114, 116. The evaporators may operate at temperatures from about 80° C. to about 110° C., such as from about 95° C. to about 100° C. The evaporators may be integral to subsequent operations, such as an SOP crystallizer (e.g., an evaporator may be part of the same vessel as an SOP crystallizer). If two or more evaporators are used, portions of each concentrated brine 114, 116 may pass through parallel evaporators.

The concentrated brine 114, 116 is split and processed in parallel in two or more processing operations 106, 108. In the first processing operation 106, one portion of the concentrated brine 114 enters an SOP crystallizer 120, which is operable to crystallize SOP 122 (i.e., $K_2SO_4$) from the concentrated brine 114. The SOP crystallizer 120 may include an MVR evaporator, an MEE, any combination thereof, or any other apparatus operable to promote crystallization of dissolved species. The SOP crystallizer 120 may operate, for example, at a temperature in a range from about 40° C. to about 100° C., such as in a range from about 70° C. to about 90° C. The SOP 122 produced may be further processed, such as by filtering, washing, drying, agglomerating (e.g., granulating or compacting), etc.

Upon removal of the crystallized SOP 122, remaining liquor 124 is optionally transferred to a second mixing apparatus 125, which may mix the liquor 124 with a portion 146 of potassium-depleted brine 134, as described in further detail below. The resulting liquor 127 is transferred to a recycle crystallizer 130 operable to form recycle stream 132 (which may include, for example, leonite, schoenite, and optionally SOP) from the liquor 124, forming a potassium-depleted brine 134. The recycle crystallizer 130 may include an MVR evaporator, an MEE, any combination thereof, or any other apparatus operable to promote crystallization of dissolved species. In some embodiments, the recycle crystallizer 130 includes stages of an MEE, and the recycle crystallizer 130 is a continuation of the MEE (i.e., some stages of the MEE are included in the SOP crystallizer 120, and some are included in the recycle crystallizer 130, which may or may not be a separate vessel). The recycle crystallizer 130 may operate, for example, at a temperature in a range from about 40° C. to about 80° C., such as in a range from about 50° C. to about 70° C. Alternatively, the recycle stream 132 may be recycled to another location, such as to the second mixing apparatus 125 or to a point within the recycle crystallizer 130 (e.g., between MEE stages).

The potassium-depleted brine 134 may be separated into two or more portions 144, 146 in a splitting device 140 (e.g., a valve, a tank, etc.). One portion 144, if split, may be purged from the system 102. Another portion 146 is transferred to the second processing operation 108 and/or to the second mixing apparatus 125. The recycle of the portion 146 of the potassium-depleted brine 134 may alter the composition of intermediate liquors, enabling precipitation of different species.

In the second processing operation 108, the second portion of the concentrated brine 116 enters an SOP crystallizer 150 operable to crystallize SOP 152 (i.e., $K_2SO_4$) from the concentrated brine 116, leaving a liquor 154. The SOP crystallizer 150 may include an MVR evaporator, an MEE, any combination thereof, or any other apparatus operable to promote crystallization of dissolved species. The SOP crystallizer 150 may operate, for example, at a temperature in a range from about 40° C. to about 100° C., such as in a range from about 70° C. to about 90° C. The SOP 152 produced may be further processed, such as by filtering, washing, drying, agglomerating (e.g., granulating or compacting), etc.

Upon removal of the crystallized SOP 152, the liquor 154 may optionally be mixed with the portion 146 of potassium-depleted brine 134 in a third mixing apparatus 160 to form a liquor 164. The liquor 164 may enter a crystallizer 170 operable to crystallize SOP 172 and/or recycle stream 173 from the liquor 164. Whether SOP 172 or recycle stream 173 or both are forced depends on the operating conditions of the crystallizer 170 and/or on the composition of the liquor 164. For example, addition of the portion 146 of potassium-depleted brine 134 to the third mixing apparatus 160 causes an increase in the concentration of magnesium in the liquor 164, such that leonite may be formed instead of SOP. If the portion 146 of potassium-depleted brine 134 is not added to the third mixing apparatus 160, SOP 172 is formed in the crystallizer 170. If SOP 172 is formed, the SOP 172 is removed for optional further processing, such as by filtering, washing, drying, granulating, etc. If leonite is formed in the crystallizer 170, the leonite is typically recycled to the first mixing apparatus 110 via recycle stream 173. A liquor 174 leaving the crystallizer 170 enters a langbeinite crystallizer 180 operable to crystallize langbeinite 182 from the liquor 174. A purge stream 184 carries uncrystallized ions from the system 102. Alternatively, the recycle stream 173 may be recycled to another location, such as to the third mixing apparatus 160 or to a point within the crystallizer 170 (e.g., between MEE stages).

In some embodiments, the potassium-depleted brine 134 from the first processing operation 106 may all be purged from the system 102. In such embodiments, the portion 146 of potassium-depleted brine 134 is not transferred to the second processing operation 108 or to the second mixing apparatus 125 of the first processing operation 106. Therefore, the second processing operation 108 may be configured to operate in a similar manner to the first processing operation 106. The flow of the portion 146 of the potassium-depleted brine 134 may be varied during operation, such as to vary the quantity and composition of products. For example, the flow of the portion 146 of the potassium-depleted brine 134 to the third mixing apparatus 160 may be stopped to increase the production of SOP 122, 152, 172, and the flow of the portion 146 of the potassium-depleted brine 134 may be started to produce langbeinite 182. Thus, the product mix may be controlled during operation of the system 102, such as to maximize economic value of the products.

In some embodiments, operation of the langbeinite crystallizer 180 is decoupled from the rest of the second processing operation 108 (e.g., from the SOP crystallizer 150, the crystallizer 170, and the third mixing apparatus 160). Such decoupling allows the amount of langbeinite 182 produced to vary, such as to maximize economic output of the system 102. Since formation of langbeinite 182 decreases the amount of SOP 172 available for sale, market conditions may suggest making less langbeinite 182 than is theoretically possible. That is, the purge stream 184 may include a concentration of magnesium ions that could be recovered, but that is profitably treated for disposal instead (e.g., because the SOP needed to convert the magnesium ions to langbeinite is more valuable than langbeinite that could be produced). In some embodiments, the purge stream 184 is used to produce epsomite, kieserite, or some other material.

Langbeinite may alternatively be formed at any selected point in the process. For example, langbeinite may be formed from the concentrated brine 114, 116, any of the liquors 124, 127, 154, 164, 174, and/or the potassium-depleted brine 134. Langbeinite may be used to form leonite or schoenite via decomposition, or may itself be a useful product. Alternatively, in some embodiments, leonite or schoenite may be formed directly from the concentrated brine 114, 116, any of the liquors 124, 127, 154, 164, 174, and/or the potassium-depleted brine 134 without first forming langbeinite.

The first processing operation 106 and the second processing operation 108 may each be configured as MEEs or as MVR evaporators. MEEs and MVR evaporators may operate at temperature ranges from about 30° C. to about 115° C., for example, from about 50° C. to about 100° C. MVR evaporators are generally designed to have a narrower operating range than MEEs, such as from about 85° C. to about 100° C. Operating ranges of equipment are selected based on economic and operational requirements.

The systems 2, 102 may include other elements or components not shown in FIG. 1 or 2. For example, the systems 2, 102 may include material-handling equipment, such as pumps, augers, tilt tables, tanks, piping, sensors, valves, controllers, etc. The systems 2, 102 may be controlled by one or more computers, such as a programmable logic controller (PLC). In such embodiments, a computer detects operating conditions of the systems 2, 102 via one or more sensors and adjusts the flow of materials into, out of, or within the systems 2, 102 accordingly. The systems 2, 102 may alternatively or additionally be controlled by one or more human operators. Though shown as continuous-flow operations, the systems 2, 102 may also be configured to operate in batch mode, as will be understood by a person having ordinary skill in the art.

The processing methods and systems disclosed herein offer advantages over conventional methods and systems. For example, producing SOP as described herein may require less energy than conventional methods. Energy from one operation may be recovered for use in another operation described herein. Some systems of the present disclosure require smaller equipment, keeping capital and operating costs lower than in conventional processing systems, such as those requiring large evaporation ponds. In some embodiments, the ratio of products can be varied in-process, based on market demand or other factors. For example, a processing system 102 may operate such that all or nearly all of the potassium becomes SOP, while the magnesium is purged from the system for crystallization into epsomite, kieserite, etc. The same processing system may be operated at a different time with different operating conditions, such that as little as about 50% (on a molar basis) of the available potassium becomes SOP, while the remainder, along with magnesium, becomes langbeinite. The product mix may be shifted as necessary to maximize the value of products and to maximize profits. Such flexibility limits the economic risk of building a processing plant employing methods disclosed herein, because a decline in the price of one product may be at least partially offset by a change in the product mix.

The methods and systems disclosed herein may be used in conjunction with utilities (e.g., electricity, steam, etc.) supplied by local suppliers, and/or by cogeneration. For example, the systems 2, 102 may be designed such that a majority of the electricity required to operate is generated by one or more power-generation systems. Systems 2, 102 can be connected to a local electrical grid configured to continuously supply a small amount of electricity, and that can temporarily supply enough electricity to operate the system 2, 102 in the case of interruption of cogeneration. By sizing the cogeneration system to supply slightly less than the total operational needs, the cogeneration system continuously operates at full capacity without the need to sell excess power to local utility suppliers. Yet, the utility costs are controlled primarily by the costs of cogeneration fuel, rather than by electric utility rates. The system 2, 102 may also be configured to recover energy (e.g., as heat) from one portion of the process for use in another portion of the process.

A portion of the recovered products may be in an ultra-fine particle size. Such ultra-fine material may be advantageously granulated or pelletized to produce larger size particles, which are generally less prone to dusting, and are more easily handled.

Granulation, compaction, and/or pelletization may be accomplished in conventional equipment, such as a pan granulator, a pelletizer including one or more extruders, etc. Conventional organic and/or inorganic binding agents may be introduced to form granules or pellets having a selected size, hardness, purity, etc. For example, particles may be agglomerated with carbonates, sulfates, silicates, surfactants, fiber-based materials, polymers, starches, etc.

Granules or pellets may be formed by melting a small fraction of product (e.g., SOP or langbeinite) to form a free-flowing liquid, which may then be mixed with other particles in a granulator or pelletizer to form particles having a selected size, hardness, purity, etc. The melted material binds the particles together as it solidifies. Other inorganic chemicals may be melted for use as such a binder, and the binder may or may not have the same composition as the particles to be bound. Some possible binders include potassium sulfate, leonite, langbeinite, schoenite, magnesium carbonate, calcium sulfate, silicates, etc.

Granulation of products formed by processes disclosed herein may differ from granulation of natural mineral products (i.e., crystals produced from mining operations without recrystallization). For example, langbeinite formed by crystallization may incorporate water molecules in conventional granulation processes. Without being bound to any particular theory, it is believed that recrystallized langbeinite may partially decompose on contact with water. The water then becomes part of the crystalline structure by hydration. This hydration may contribute to formation of granules with desirable physical properties, but also decreases the weight fraction of potassium in the granules (generally expressed as $K_2O$ content). To avoid this dilution of potassium content, it may be desirable to prevent or reverse water uptake by the crystalline structure.

In some embodiments, crystallized particles are partially dehydrated in one or more stages before granulation. For example, particles may be heated to a temperature of about 20° C. or higher, followed by a second heating to a temperature of about 90° C. or higher. In some embodiments, particles are dehydrated by heating to a temperature of at least 200° C. or at least 250° C. Granules may be dehydrated after the granulation process, in addition to or instead of dehydration before the granulation process. For example, granulated material may be heated to a temperature of about 100° C. or higher, or to a temperature of about 250° C. or higher. In certain embodiments, a shell is formed over granulated material. For example, water (e.g., a water mist, steam, etc.) added to a granulated material becomes incorporated into the crystalline structure of an outermost portion of the granulated material. Thus, a shell of hydrated crystalline material may surround or encapsulate an inner core.

In some embodiments, other products are recovered from various process flows. For example, a portion of leonite may be removed, filtered, dried, and granulated. As another example, some possible products include mixtures or solutions, such as soluble-grade fertilizers or products separable by flotation.

The following examples serve to explain embodiments of the present disclosure in more detail. These examples are not to be construed as being exhaustive or exclusive.

EXAMPLES

Example 1

Mechanical Vapor Recompression with Langbeinite Recycle

Figure 3:
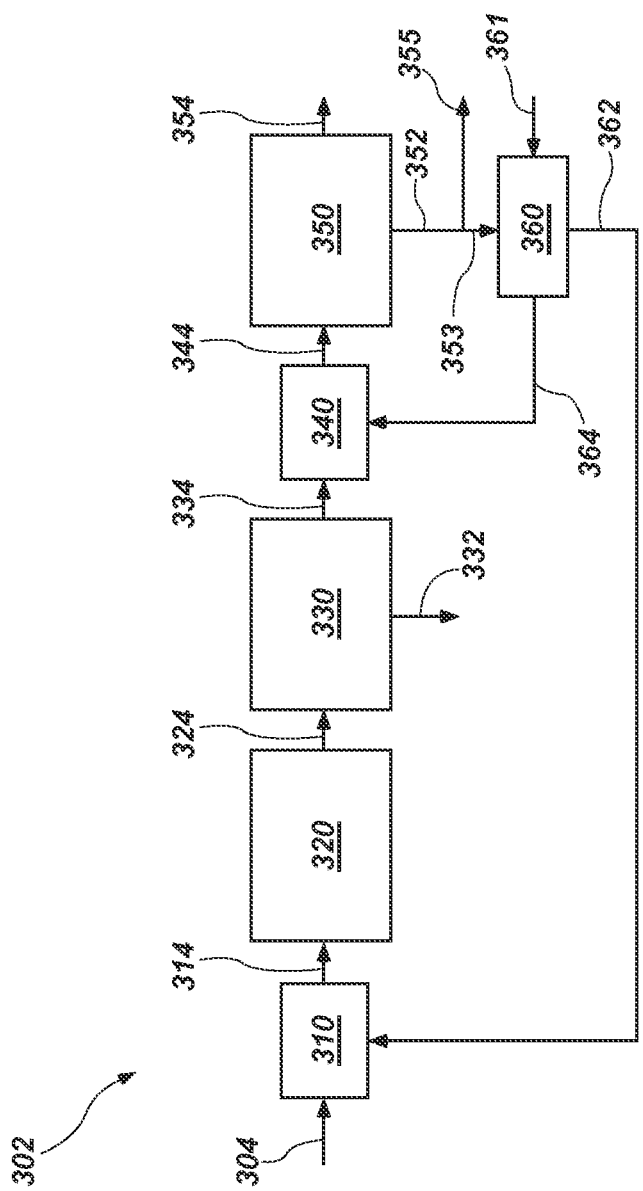

A process-flow diagram and system 302 for this example are shown in FIG. 3. Leach brine 304 is mixed with recycle crystals 362 in a mixer 310 to form liquor 314. Water is evaporated from liquor 314 in a pre-concentration evaporator 320 operating at about 100° C. to form liquor 324, which is more concentrated than liquor 314. Liquor 324 enters a first MVR evaporator 330 operating at about 85° C., wherein SOP crystals 332 are formed and removed to form liquor 334. Liquor 334 is mixed with potassium-depleted brine 364 in a mixer 340, forming liquor 344. Liquor 344 enters a second MVR apparatus 350 operating at about 100° C. Langbeinite crystals 352 form in the second MVR apparatus 350 and are separated from a purge stream 354. A portion 353 of the langbeinite crystals 352 is mixed with water 361 in a mixer 360 to form the recycle crystals 362 and the potassium-depleted brine 364. Another portion 355 of the langbeinite crystals 352 is removed from the system as a product. The recycle crystals 362 are recycled to the mixer 310, and the potassium-depleted brine 364 is recycled to the mixer 340.

Example 2

Mechanical Vapor Recompression without Langbeinite Recycle

Figure 4:
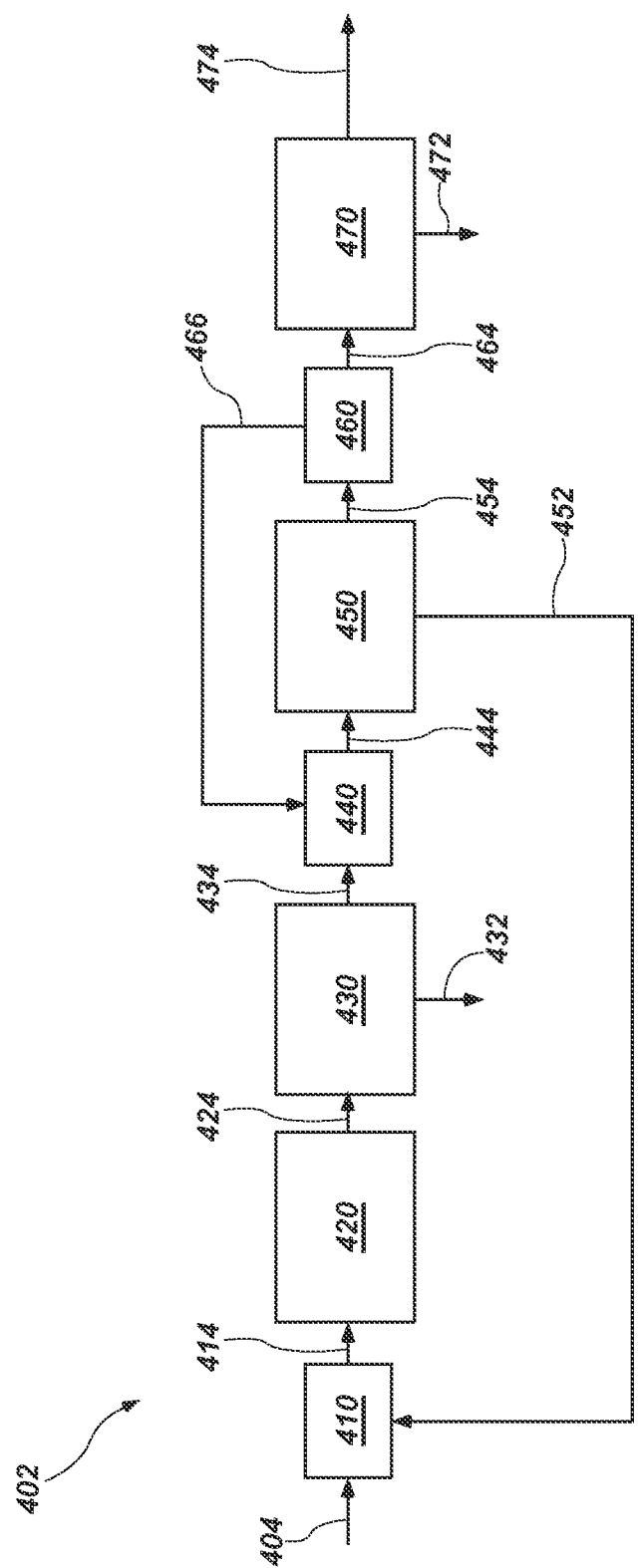

A process-flow diagram and system 402 for this example are shown in FIG. 4. Leach brine 404 is mixed with recycle crystals 452 in a mixer 410 to form liquor 414. Water is evaporated from the liquor 414 in a pre-concentration evaporator 420 to form liquor 424. Liquor 424 enters a first MVR evaporator 430 operating at about 85° C., wherein SOP crystals 432 are formed and removed to form liquor 434. Liquor 434 is mixed with a portion 466 of potassium-depleted brine 454 in a mixer 440 to form liquor 444. Liquor 444 enters a second MVR evaporator 450 operating at about 70° C. The recycle crystals 452 form in the second MVR evaporator 450 and are separated from potassium-depleted brine 454. The crystals 452 are recycled back to the mixer 410. The potassium-depleted brine 454 is split in a splitting apparatus 460 to form two portions 464 and 466. One portion 466 is recycled to the mixer 440, and the other portion 464 enters a third MVR evaporator 470 operating at about 100° C. Langbeinite 472 is formed and separated from a purge stream 474 in the third MVR evaporator 470.

Example 3

Parallel Multiple-Effect Evaporation (MEE) to Form SOP and Langbeinite

Figure 5:
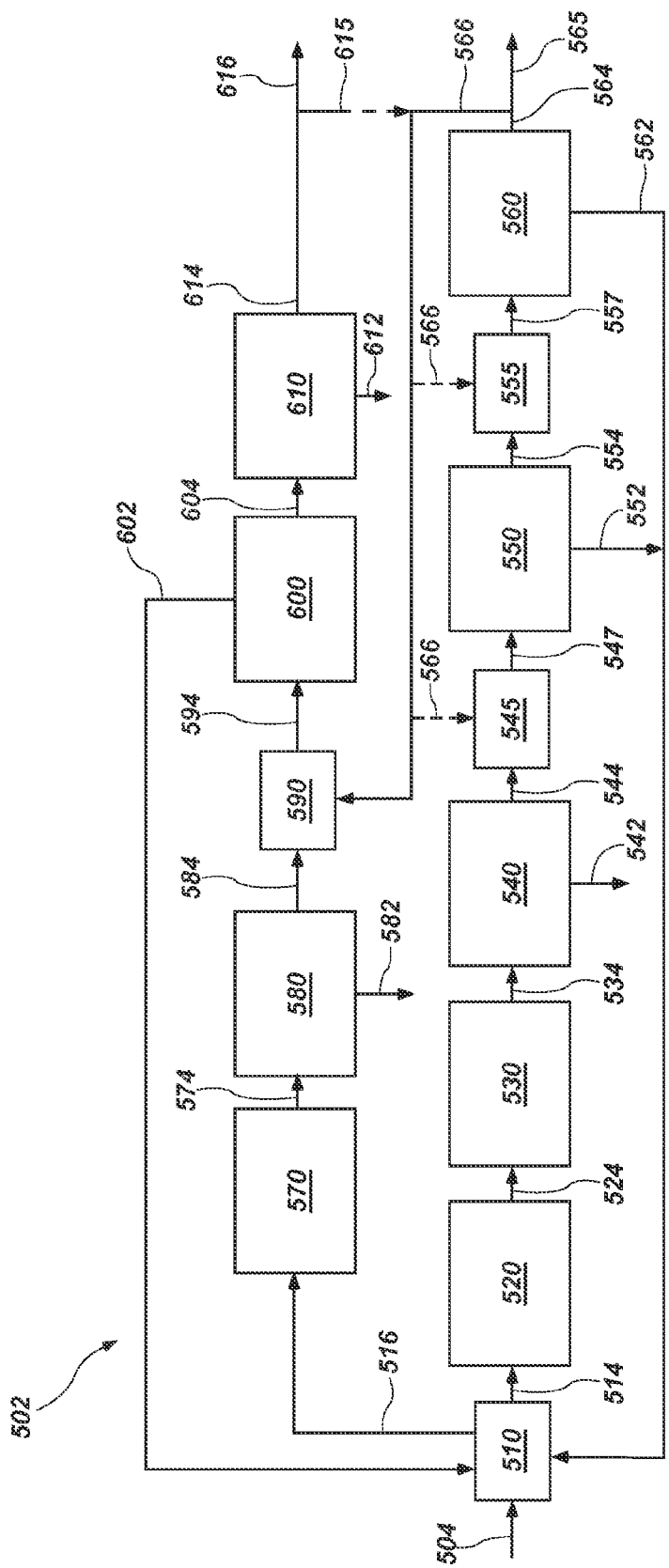

A process-flow diagram and system 502 for this example are shown in FIG. 5. Leach brine 504 is mixed with recycle crystals 552, 562, 602 (which may include leonite and/or SOP) in a mixer 510 to form liquors 514, 516. Each liquor 514, 516 enters one of two MEEs. In one MEE shown in FIG. 5 (comprising pre-concentrators 520, 530 and crystallizers 540, 550, and 560), the first evaporation stage operates at about 100° C., and each subsequent stage operates at a temperature approximately 12° C. lower than the previous stage. Water is evaporated from liquor 514 in an MEE pre-concentrator 520 (i.e., an effect of an MEE) operating at about 100° C. to form liquor 524. Additional water is evaporated from liquor 524 in another MEE pre-concentrator 530 operating at about 88° C. to form liquor 534. Liquor 534 enters an SOP crystallizer 540 (i.e., a third MEE effect) operating at about 76° C. to form SOP crystals 542 and liquor 544. Liquor 544 optionally enters a mixer 545, where it may be mixed with a portion of a potassium-depleted stream 566 to form liquor 547. Liquor 547 enters a crystallizer 550 (i.e., a fourth MEE effect) operating at about 64° C. to form recycle crystals 552 and liquor 554. Liquor 554 optionally enters a mixer 555, where it may be mixed with a potassium-depleted stream 566 to form liquor 557. Liquor 557 enters a crystallizer 560 (i.e., a fifth MEE effect) operating at about 50° C. to form recycle crystals 562 and liquor 564. SOP crystals 542 are separated for drying, granulation, and/or sale. SOP formed in the same stage as leonite (e.g., any SOP in the recycle crystals 552) is recycled to the mixer 510, with the leonite. The liquor 564 leaving the MEE is a potassium-depleted liquid that may be split between a purge stream 565 and a potassium-depleted stream 566 for input to a parallel process, as described below. Though two mixers 545 and 555 are shown in FIG. 5, the process may operate with only one mixer or without any mixers. In general, the mixer 545 or 555 (if present) is disposed before the first stage in which recycle crystals are formed.

Liquor 516 enters another MEE having four evaporation stages. Water is evaporated from liquor 516 in an MEE pre-concentrator 570 operating at about 100° C. to form liquor 574. Liquor 574 enters an SOP crystallizer 580 operating at about 76° C. to form SOP crystals 582 and liquor 584. Liquor 584 is mixed with a portion of the potassium-depleted stream 566, and, optionally, with potassium-depleted stream 615 in a mixer 590 to form liquor 594. Liquor 594 enters a crystallizer 600 operating at about 63° C. to form recycle crystals 602 and liquor 604. Liquor 604 enters a crystallizer 610 operating at about 88° C. to form langbeinite crystals 612 and liquor 614. SOP crystals 582 are separated for drying, granulation, and/or sale, and may be combined with SOP crystals 542 formed in the other MEE. SOP formed in the same stage as leonite (e.g., any SOP in the recycle crystals 602) is recycled to the mixer 510, with the leonite. Langbeinite crystals 612 are also separated for drying, granulation, and/or sale. The liquor 614 leaving the MEE is a potassium-depleted liquid that may be split between a purge stream 616 and the potassium-depleted stream 615 for recycle to mixer 590.

The volumetric flow through each MEE may be varied based on product demand. Thus, the product mix may be varied to maximize economic value.

Example 4

Parallel Multiple-Effect Evaporation (MEE) to Form SOP

Figure 6:
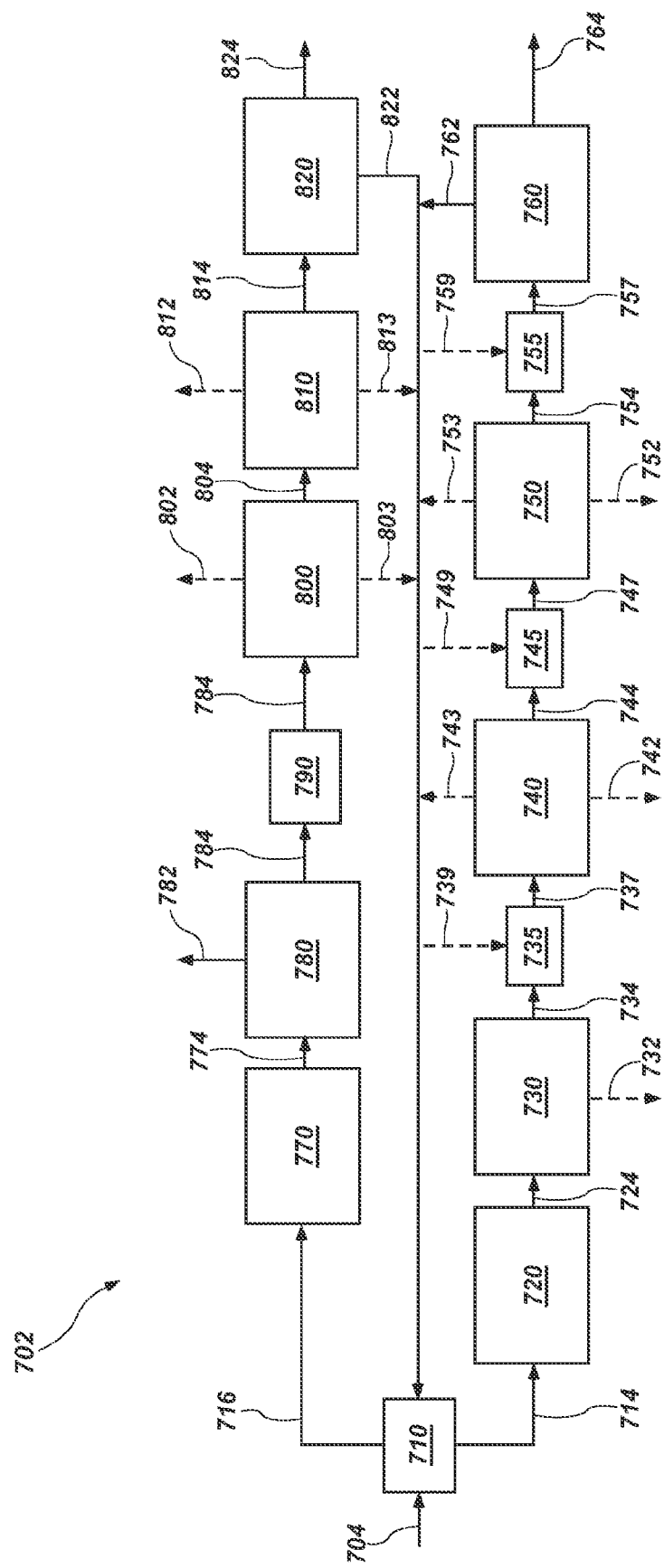

A process-flow diagram and system 702 for this example are shown in FIG. 6. Example 4 is similar to Example 3, but without passing the potassium-depleted stream 566 to a parallel MEE process. The system 502 of FIG. 5 may be operated as described in Example 4, and the system 702 may be operated as described in Example 3, by redirecting the potassium-depleted stream 566 or the purge stream 764.

Leach brine 704 is mixed with recycle crystals 743, 753, 762, 803, 813, and/or 822 in a mixer 710 to form liquors 714, 716. Each liquor 714, 716 enters one of two MEEs. In one MEE shown in FIG. 6 (comprising effects 720, 730, 740, 750, and 760), the first effect 720 operates at about 100° C., and each subsequent effect operates at a temperature approximately 12° C. lower than the previous stage. Water is evaporated from liquor 714 in first effect 720 (a pre-concentrator) operating at about 100° C. to form liquor 724. Additional water may be evaporated from liquor 724 in second effect 730 (which may be another MEE pre-concentrator or an SOP crystallizer) operating at about 88° C. to form liquor 734. SOP 732 may optionally be formed in the second effect 730. Liquor 734 optionally enters a mixer 735, where it may be mixed with a portion of recycle crystals 739 to form liquor 737. Liquor 737 enters third effect 740 (a crystallizer) operating at about 76° C. to form SOP crystals 742 or recycle crystals 743 (e.g., leonite or leonite and SOP) and liquor 744. If the third effect 740 forms essentially or entirely SOP crystals 742, the SOP crystals 742 may be removed from the system 702 for further processing, sale, or use. If the third effect 740 forms leonite or leonite and SOP crystals, recycle crystals 743 may be recycled to a prior stage of the process. Liquor 744 optionally enters a mixer 745, where it may be mixed with a portion of recycle crystals 749 to form liquor 747. Liquor 747 enters a fourth effect 750 (a crystallizer) operating at about 64° C. to form SOP crystals 752 or recycle crystals 753 and liquor 754, similar to those of the third effect 740. If the fourth effect 750 forms leonite or leonite and SOP, these recycle crystals 753 may be recycled to a prior stage of the process. Liquor 754 optionally enters a mixer 755, where it may be mixed with a portion of recycle crystals 759 to form liquor 757. Liquor 757 enters a fifth effect 760 operating at about 50° C. to form recycle crystals 762 (e.g., leonite) and purge stream 764. These recycle crystals 762 are also recycled to a prior stage of the process. The recycle crystals 743, 753, 762 may be recycled to the mixer 710, the mixer 735, the mixer 745, and/or the mixer 755. Though three mixers 735, 745, and 755 are shown between MEE effects in FIG. 6, the process may operate with only one mixer or without any mixers. In general, the mixer 735, 745, or 755 (if present) is disposed before the first stage in which recycle crystals are formed.

Another MEE (comprising effects 770, 780, 800, 810, and 820) operates in a similar manner. Water is evaporated from liquor 716 in first effect 770 (a pre-concentrator) operating at about 100° C. to form liquor 774. SOP 782 is formed from liquor 774 in second effect 780 (a crystallizer) operating at about 88° C., and forming liquor 784. Liquor 784 enters a mixer 790, and leaves unchanged (the mixer 790 being reserved for operation in which a potassium-depleted stream is mixed). Liquor 784 enters third effect 800 (a crystallizer) operating at about 76° C. to form SOP crystals 802 or recycle crystals 803 and liquor 804. If the third effect 800 forms essentially or entirely SOP crystals 802, the SOP crystals 802 may be removed from the system 702 for further processing, sale, or use. If the third effect 800 forms recycle crystals 803, the recycle crystals 803 may be recycled to the mixer 710. Liquor 804 enters a fourth effect 810 (a crystallizer) operating at about 64° C. to form SOP crystals 812 or recycle crystals 813 and liquor 814, similar to those of the third effect 800. If the fourth effect 810 forms recycle crystals 813, the recycle crystals 813 may be recycled to the mixer 710. Liquor 814 enters a fifth effect 820 operating at about 50° C. to form leonite crystals 822 and purge stream 824. The recycle crystals 822 are also recycled to the mixer 710.

The product output of Examples 3 and 4 may be varied by switching the potassium-depleted recycle stream on or off. For example, when the only stream entering the mixer 790 is stream 784, the third effect 800 and fourth effect 810 may produce SOP and/or leonite crystals. If a portion of the purge stream 764 containing a potassium-depleted liquor is instead transferred to the mixer 790, the third effect 800 and fourth effect 810 may produce langbeinite, and the fifth effect 820 may be bypassed. The flow of potassium-depleted liquor to mixer 790 may be varied with time to form an economically advantageous amount of each product. For example, the system 702 may be operated to produce SOP and langbeinite for one week by flowing potassium-depleted liquor from stream 764 to mixer 790, then operated to produce SOP as the only sulfate product for two weeks by not flowing any potassium-depleted liquor from stream 764 to mixer 790. Thus, the product mix may be varied, such as to maximize economic value.

Example 5

Multiple-Effect Evaporation (MEE) to Form SOP and Langbeinite

Figure 7:
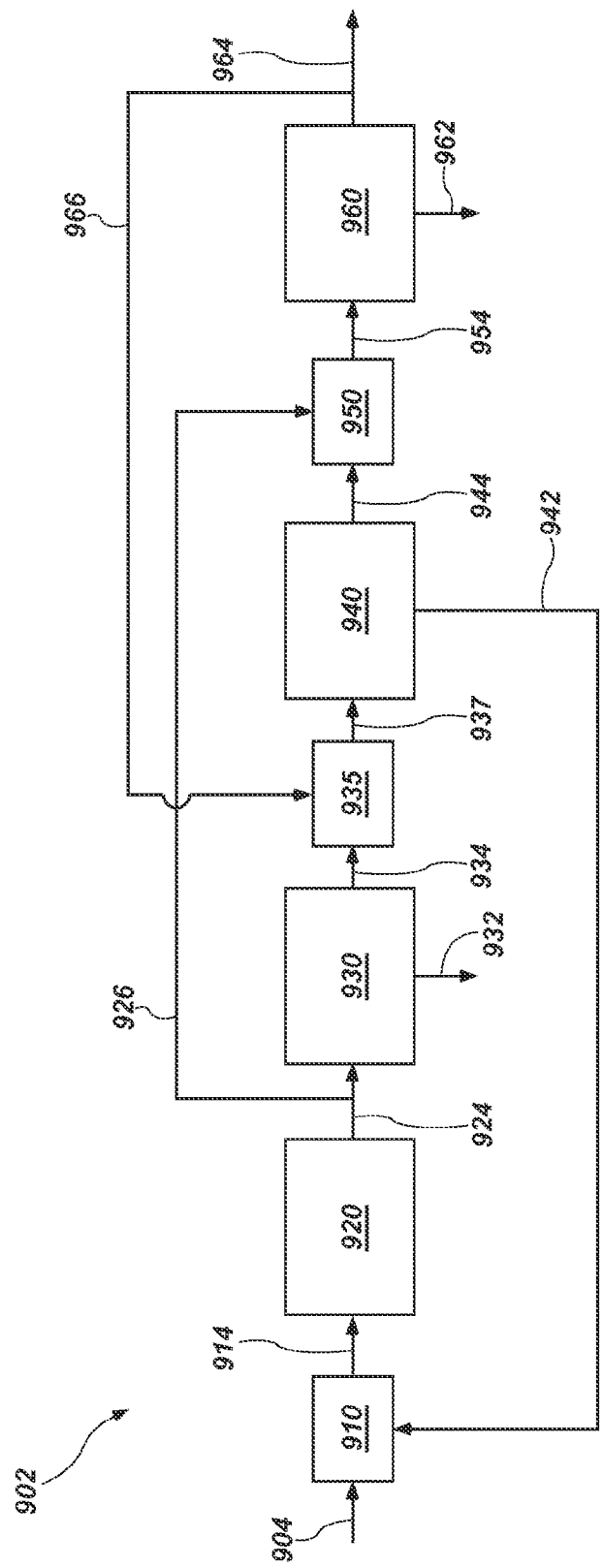

A process-flow diagram and system 902 for this example are shown in FIG. 7. Leach brine 904 is mixed with recycle crystals 942 (e.g., leonite or leonite and SOP) in a mixer 910 to form liquor 914. Liquor 914 enters an MEE having a series of evaporation stages (e.g., four effects). The first evaporation stage operates at about 100° C., and each subsequent stage operates at a temperature approximately 12° C. lower than the previous stage. Water is evaporated from liquor 914 in an MEE pre-concentrator 920 (a first effect of the MEE) operating at about 100° C. to form liquor 924. A bypass portion 926 of the liquor 924 bypasses the next two effects, and the remainder of the liquor 924 enters an SOP crystallizer 930 (a second effect) operating at about 88° C. to form SOP crystals 932 and liquor 934. Liquor 934 optionally enters a mixer 935, where it may be mixed with a portion of a potassium-depleted stream 966 to form liquor 937. Liquor 937 enters a crystallizer 940 (a third effect) operating at about 76° C. to form the recycle crystals 942 and liquor 944. Liquor 944 is mixed with the bypass portion 926 of liquor 924 in mixer 950 to form liquor 954. Liquor 954 enters a crystallizer 960 (a fourth effect) operating at about 62° C. to form langbeinite crystals 962 and purge stream 964. SOP crystals 932 and langbeinite crystals 962 are separated for drying, granulation, and/or sale.

Example 6

Multiple-Effect Evaporation (MEE) to Form SOP and Langbeinite

Figure 8:
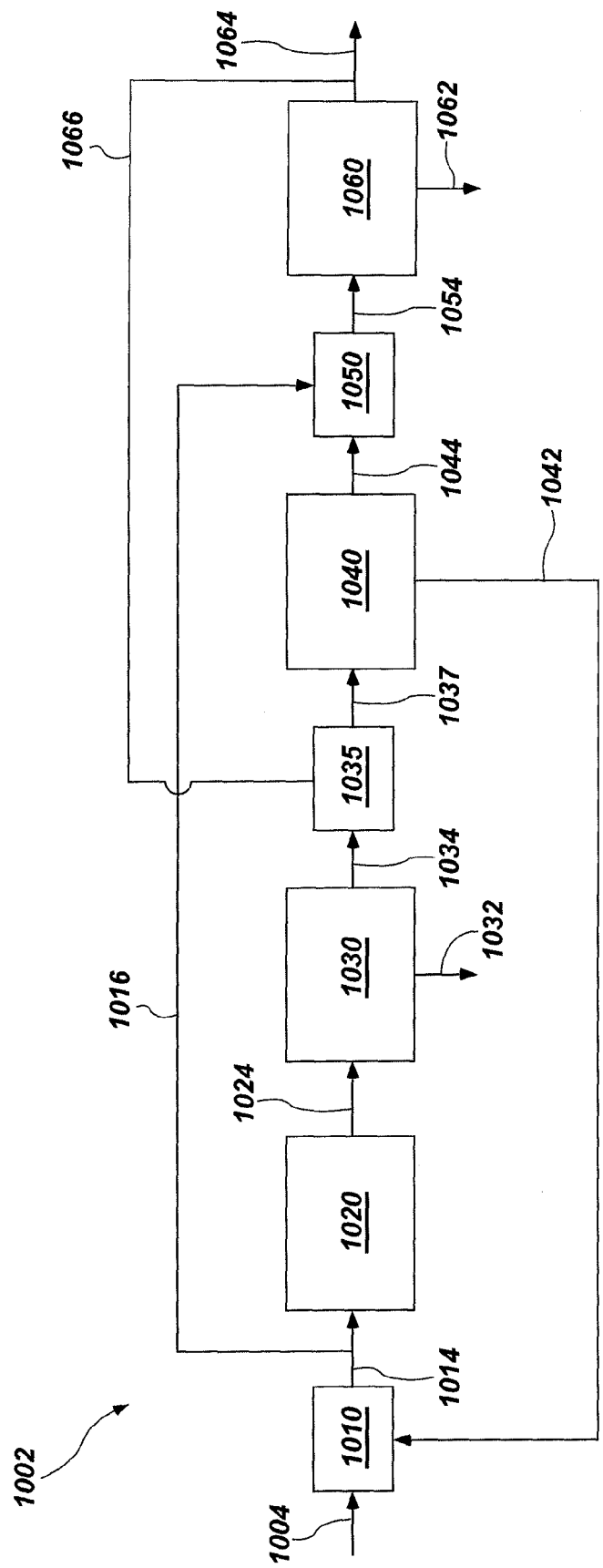

A process-flow diagram and system 1002 for this example are shown in FIG. 8. Example 6 is similar to Example 5, but with the bypass portion extracted before the first effect of the MEE.

Leach brine 1004 is mixed with recycle crystals 1042 in a mixer 1010 to form liquor 1014. A bypass portion 1016 of the liquor 1014 bypasses the first three effects of an MEE having a series of evaporation stages (e.g., four effects), and the remainder of the liquor 1014 enters the MEE. The first stage operates at about 100° C., and each subsequent stage operates at a temperature approximately 12° C. lower than the previous stage. Water is evaporated from liquor 1014 in an MEE pre-concentrator 1020 (a first effect of the MEE) operating at about 100° C. to form liquor 1024. Liquor 1024 enters an SOP crystallizer 1030 (a second effect) operating at about 88° C. to form SOP crystals 1032 and liquor 1034. Liquor 1034 optionally enters a mixer 1035, where it may be mixed with a portion of a potassium-depleted stream 1066 to form liquor 1037. Liquor 1037 enters a crystallizer 1040 (a third effect) operating at about 76° C. to form recycle crystals 1042 and liquor 1044. Liquor 1044 is mixed with the bypass portion 1016 of liquor 1014 in mixer 1050 to form liquor 1054. Liquor 1054 enters a crystallizer 1060 (a fourth effect) operating at about 62° C. to form langbeinite crystals 1062 and purge stream 1064. SOP crystals 1032 and langbeinite crystals 1062 are separated for drying, granulation, and/or sale.

Example 7

Multiple-Effect Evaporation (MEE) with Separate Langbeinite Crystallization

Figure 9:
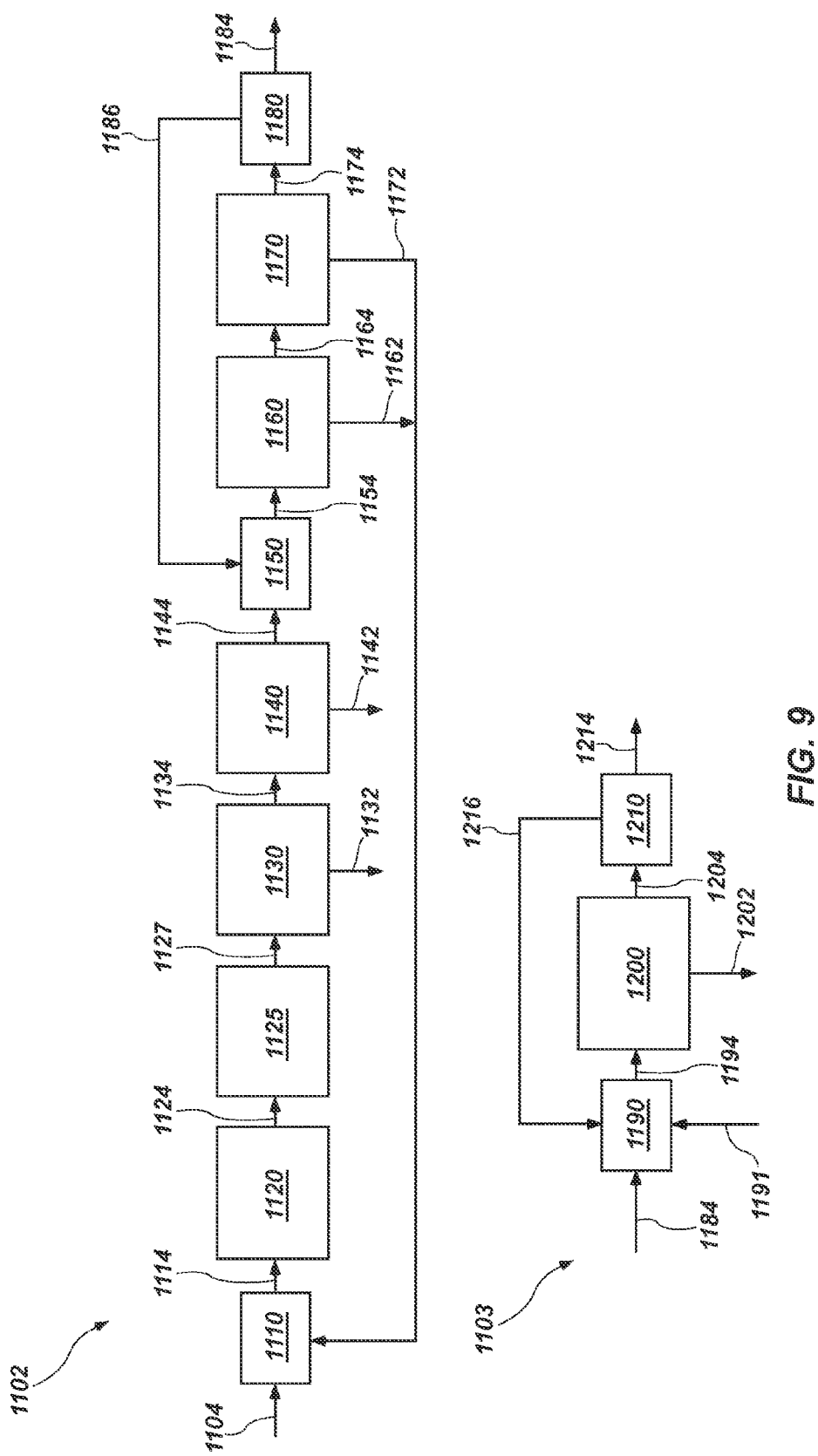

A process-flow diagram and systems 1102 and 1103 for this example are shown in FIG. 9. Approximately 1654 tons per hour (TPH) of leach brine 1104 is mixed with approximately 301.4 TPH recycle crystals 1162, 1172 in a mixer 1110 to form approximately 1955 TPH of liquor 1114. The leach brine 1104 includes about 6.50 g $K_2SO_4$ per 100 g $H_2O$ (about 6.71 moles of potassium sulfate per 1,000 moles of water) and about 4.49 g $MgSO_4$ per 100 g $H_2O$ (about 6.71 moles of magnesium sulfate per 1,000 moles of water). The recycle crystals 1162, 1172 include about 143.1 TPH of $K_2SO_4$, about 98.88 TPH of $MgSO_4$, and about 59.13 TPH of water. Water is evaporated from the liquor 1114 in a pre-concentration evaporator 1120 (a first effect of the MEE) operating at about 116° C. to form liquor 1124. Liquor 1124 enters a second pre-concentration evaporator 1125 (a second effect of the MEE) operating at about 103° C. to form liquor 1127. The pre-concentration evaporators 1120, 1125 together evaporate approximately 366.2 TPH of water. The compositions of the materials entering and leaving the mixer 1110 and the pre-concentration evaporators 1120, 1125 are as shown in Table 1 below.

TABLE 1

|  | Leach brine 1104 | Recycle Crystals 1162 & 1172 | Liquor 1114 | Liquor 1127 |
| --- | --- | --- | --- | --- |
| g $K_2SO_4$ per 100 g $H_2O$ | 6.50 | — | 15.49 | 20.29 |
| g $MgSO_4$ per 100 g $H_2O$ | 4.49 | — | 10.70 | 14.01 |
| TPH $K_2SO_4$ | 96.85 | 143.1 | 240.0 | 240.0 |

TABLE 1-continued

|  | Leach brine 1104 | Recycle Crystals 1162 & 1172 | Liquor 1114 | Liquor 1127 |
| --- | --- | --- | --- | --- |
| TPH $MgSO_4$ | 66.90 | 98.88 | 165.8 | 165.8 |
| TPH $H_2O$ | 1490 | 59.13 | 1549 | 1183 |
| TPH total | 1654 | 301.1 | 1955 | 1589 |

Liquor 1127 enters a crystallizer 1130 (a third effect) operating at about 89° C., wherein SOP crystals 1132 are formed and removed to form liquor 1134. Liquor 1134 enters a crystallizer 1140 (a fourth effect) operating at about 75° C., wherein SOP crystals 1142 are formed and removed to form liquor 1144. Together, the crystallizers 1130, 1140 evaporate about 513.2 TPH of water to form about 87.56 TPH of SOP crystals 1132, 1142 (which equals approximately 90.4% of the $K_2SO_4$ in the leach brine 1104). Liquor 1144 is mixed with a potassium-depleted portion 1186 of liquor 1174 (which is potassium-depleted) in a mixer 1150 to form liquor 1154. The compositions of the materials entering and leaving the crystallizers 1130, 1140 and the mixer 1150 are as shown in Table 2 below.

TABLE 2

|  | Liquor 1127 | Liquor 1144 | Portion 1186 of Liquor 1174 | Liquor 1154 |
| --- | --- | --- | --- | --- |
| g $K_2SO_4$ per 100 g $H_2O$ | 20.29 | 22.76 | 6.78 | 21.01 |
| g $MgSO_4$ per 100 g $H_2O$ | 14.01 | 24.75 | 48.83 | 27.38 |
| TPH $K_2SO_4$ | 240.0 | 152.4 | 5.57 | 158.0 |
| TPH $MgSO_4$ | 165.8 | 165.8 | 40.14 | 205.9 |
| TPH $H_2O$ | 1183 | 669.8 | 82.21 | 752.1 |
| TPH total | 1589 | 988.0 | 127.9 | 1116 |

Liquor 1154 enters a crystallizer 1160 (a fifth effect) operating at about 61° C., wherein recycle crystals 1162 are formed and removed to form liquor 1164. Liquor 1164 enters a crystallizer 1170 (a sixth effect) operating at about 49° C., wherein recycle crystals 1172 are formed and removed to form liquor 1174. A splitter 1180 divides the liquor 1174 into portions 1184, 1186, and portion 1184 is removed from the system 1102 to system 1103 for langbeinite production. Portion 1186 is recycled to the mixer 1150. The crystallizers 1160 and 1170 together form a recycle crystallizer system, removing approximately 473.7 TPH of water and forming approximately 301.1 TPH of recycle crystals 1162 and 1172 as leonite. The compositions of the materials entering and leaving the recycle crystallizer system are as shown in Table 3 below.

TABLE 3

|  | Liquor 1154 | Recycle Crystals 1162 & 1172 | Liquor 1174 | Portion 1184 of Liquor 1174 | Portion 1186 of Liquor 1174 |
| --- | --- | --- | --- | --- | --- |
| g $K_2SO_4$ per 100 g $H_2O$ | 21.01 | — | 6.78 | 6.78 | 6.78 |
| g $MgSO_4$ per 100 g $H_2O$ | 27.38 | — | 48.83 | 48.83 | 48.83 |
| TPH $K_2SO_4$ | 158.0 | 143.1 | 14.86 | 9.29 | 5.57 |
| TPH $MgSO_4$ | 205.9 | 98.88 | 107.0 | 66.90 | 40.14 |
| TPH $H_2O$ | 752.1 | 59.13 | 219.2 | 137.01 | 82.21 |
| TPH total | 1116 | 301.1 | 341.1 | 213.2 | 127.9 |

Langbeinite is formed in a separate system 1103, decoupled from the MEE of system 1102. Portion 1184 of liquor 1174 is mixed with approximately 11.27 TPH of SOP 1191 and approximately 85.14 TPH of a recycle stream 1216 in a mixer 1190 to form approximately 309.6 TPH of liquor 1194. SOP 1191 may be a portion of SOP crystals 1132, 1142 formed in the system 1102 described above or may be formed in some other process. Liquor 1194 enters a crystallizer 1200, which may be an evaporator (e.g., single-effect evaporator, MEE, MVR evaporator, etc.) configured to remove approximately 47.09 TPH of water, forming approximately 35.49 TPH of langbeinite 1202 and approximately 227.0 TPH of liquor 1204. The crystallizer 1200 or a portion thereof operates at a temperature of about 100° C. The langbeinite 1202 may be separated from liquor 1204 for drying, granulation, and/or sale, and a splitter 1210 divides the liquor 1204 into a purge stream 1214 and the recycle stream 1216. The recycle stream 1216 is recycled to the mixer 1190. The compositions of the material flows within the system 1103 are as shown in Table 4 below.

TABLE 4

| | Portion 1184 of Liquor 1174 | Recycle stream 1216 | Liquor 1194 | Liquor 1204 | Purge stream 1214 |
|---|---|---|---|---|---|
| g $K_2SO_4$ per 100 g $H_2O$ | 6.78 | 6.29 | 12.55 | 5.81 | 5.81 |
| g $MgSO_4$ per 100 g $H_2O$ | 48.83 | 51.50 | 49.58 | 52.17 | 52.17 |
| TPH $K_2SO_4$ | 9.29 | 3.40 | 23.96 | 8.25 | 5.16 |
| TPH $MgSO_4$ | 66.90 | 27.79 | 94.69 | 74.10 | 46.31 |
| TPH $H_2O$ | 137.01 | 53.95 | 191.0 | 142.0 | 88.77 |
| TPH total | 213.2 | 84.14 | 309.6 | 224.4 | 140.2 |

Because approximately 11.27 TPH of SOP 1191 is used as an input to the system 1103 for langbeinite production, the net production of SOP from the systems 1102, 1103 is about 76.29 TPH, or about 78.8% of the $K_2SO_4$ in the leach brine 1104. However, 35.49 TPH of langbeinite 1202 includes another 14.9 TPH of $K_2SO_4$, for a total $K_2SO_4$ recovery of about 91.19 TPH (about 94.2%). The langbeinite 1202 (35.49 TPH) also includes about 20.59 TPH of $MgSO_4$, for a total $MgSO_4$ recovery of about 30.77%. The systems 1102, 1103 remove approximately 1400 TPH of water by evaporation.

By decoupling langbeinite formation from SOP formation, operating conditions for SOP production may be held constant regardless of langbeinite requirements. Variation of langbeinite production may require adjustment to operating conditions of the separate langbeinite process and adjustment of the amount of SOP used as an input to the langbeinite process.

Example 8

Multiple-Effect Evaporation (MEE) in Parallel with Mechanical Vapor Recompression (MVR)

Figure 10:
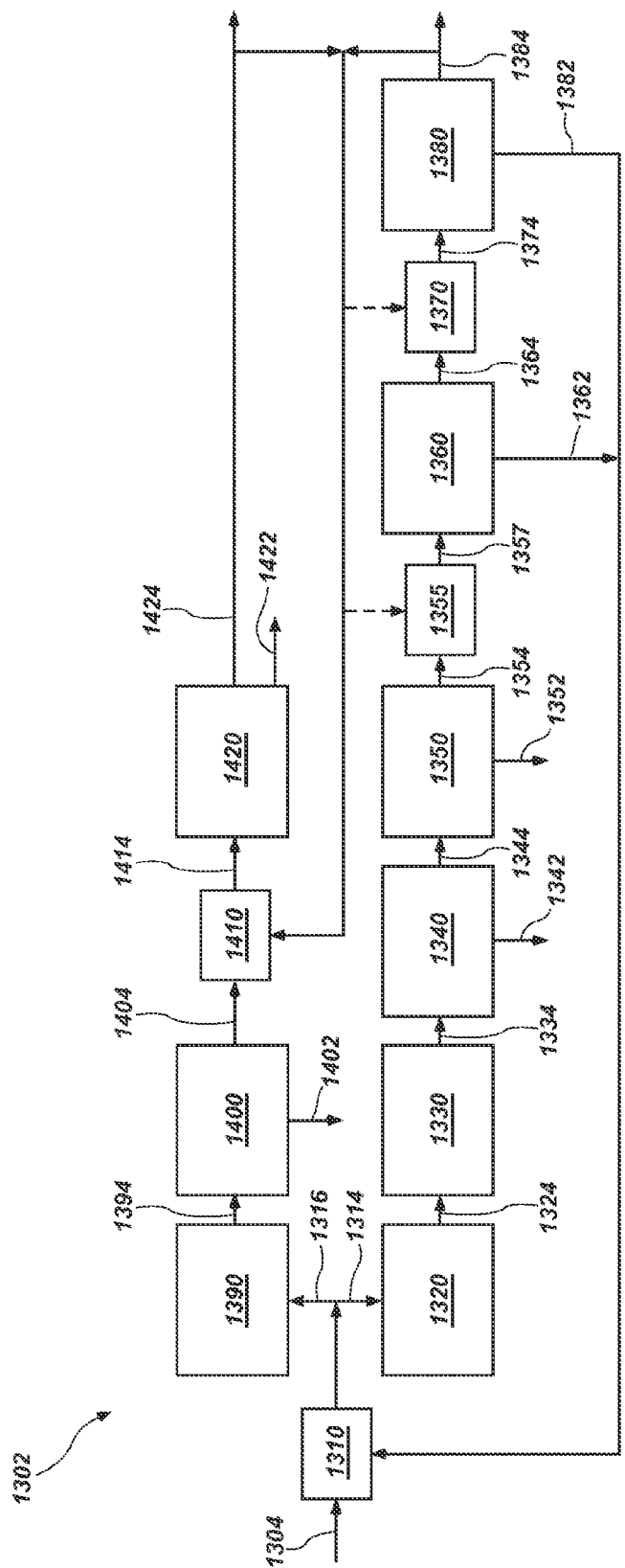

A process-flow diagram and system 1302 for this example are shown in FIG. 10. Leach brine 1304 is mixed with recycle crystals 1362, 1382 in a mixer 1310 to form liquors 1314, 1316. Each liquor 1314, 1316 enters one of two pre-concentrators 1320, 1390 operating at about 100° C. The pre-concentrators 1320, 1390 may be, for example, MVR evaporators. Though shown as two pre-concentrators 1320, 1390, in some embodiments, the liquors 1314, 1316 leaving the mixer 1310 enter a single pre-concentrator, and are split after leaving the pre-concentrator. Furthermore, each pre-concentrator 1320, 1390 may include two or more individual units operable to remove water.

Liquor 1324 leaving the pre-concentrator 1320 enters an MEE (comprising pre-concentrator 1330 and crystallizers 1340, 1350, 1360, and 1380). The first evaporation stage operates at about 100° C., and each subsequent stage operates at a temperature approximately 12° C. lower than the previous stage. Water is evaporated from liquor 1324 in a pre-concentrator 1330 (i.e., an effect of the MEE) operating at about 100° C. to form liquor 1334. Liquor 1334 enters an SOP crystallizer 1340 (i.e., a second MEE effect) operating at about 88° C. to form SOP crystals 1342 and liquor 1344. Liquor 1344 enters a crystallizer 1350 (i.e., a third MEE effect) operating at about 76° C. to form SOP crystals 1352 and liquor 1354. Liquor 1354 optionally enters a mixer 1355, where it may be mixed with a portion of liquor 1384 and/or 1424 to form liquor 1357. Liquor 1357 enters a crystallizer 1360 (i.e., a fourth MEE effect) operating at about 64° C. to form recycle crystals 1362 and liquor 1364. The liquor 1364 is optionally mixed with a portion of liquor 1384 and/or 1424 in a mixer 1370 to form liquor 1374. Liquor 1374 enters a crystallizer 1380 (i.e., a fifth MEE effect) operating at about 50° C. to form recycle crystals 1382 and liquor 1384. SOP crystals 1342 and 1352 are separated for drying, granulation, and/or sale. The liquor 1384 (which may be potassium-depleted) leaving the MEE is recycled to the mixer 1370, transferred to a parallel process, as described below, and/or purged from the system 1302. Though two mixers 1355, 1370 are shown between MEE effects in FIG. 10, the process may operate with only one mixer or without any mixers. In general, the mixer 1355 or 1370 (if present) is disposed before the first stage in which recycle crystals are formed.

The parallel process includes MVR evaporators. Liquor 1394 leaving the pre-concentrator 1390 enters an SOP crystallizer 1400 (an MVR evaporator) operating at about 85° C. to form SOP crystals 1402 and liquor 1404. Liquor 1404 is mixed with a portion of liquor 1384 and/or 1424 in a mixer 1410 to form liquor 1414. Liquor 1414 enters a crystallizer 1420 operating at about 100° C. to form langbeinite crystals 1422 and liquor 1424. SOP crystals 1402 and langbeinite crystals 1422 are each separated for drying, granulation, and/or sale. SOP crystals 1402 may be combined with SOP crystals 1342 and/or 1352 formed in the MEE. The liquor 1424 leaving the crystallizer 1420 is recycled to the mixer 1410, transferred to the MEE process via mixer 1370, and/or purged from the system 1302.

In some embodiments, the potassium-depleted liquor 1384 leaving the MEE is mixed with the liquor 1424 leaving the crystallizer 1420. In other embodiments, the liquor 1384 or the liquor 1424 supply all of the recycle needs, and the other of liquors 1384 and 1424 is purged. In some embodiments, the MEE and the MVR each supply their own recycle needs. The quantities and compositions of each liquor 1384 and 1424 recycled affect the composition of liquors 1357, 1374, and 1414 by changing the input to the mixers 1355, 1370, and 1410.

The volumetric flow through the MEE and the MVRs may be varied based on product demand. Thus, the product mix may be varied, such as to maximize economic value.

Example 9

Multiple-Effect Evaporation (MEE) in Parallel with Mechanical Vapor Recompression (MVR)

Figure 11:
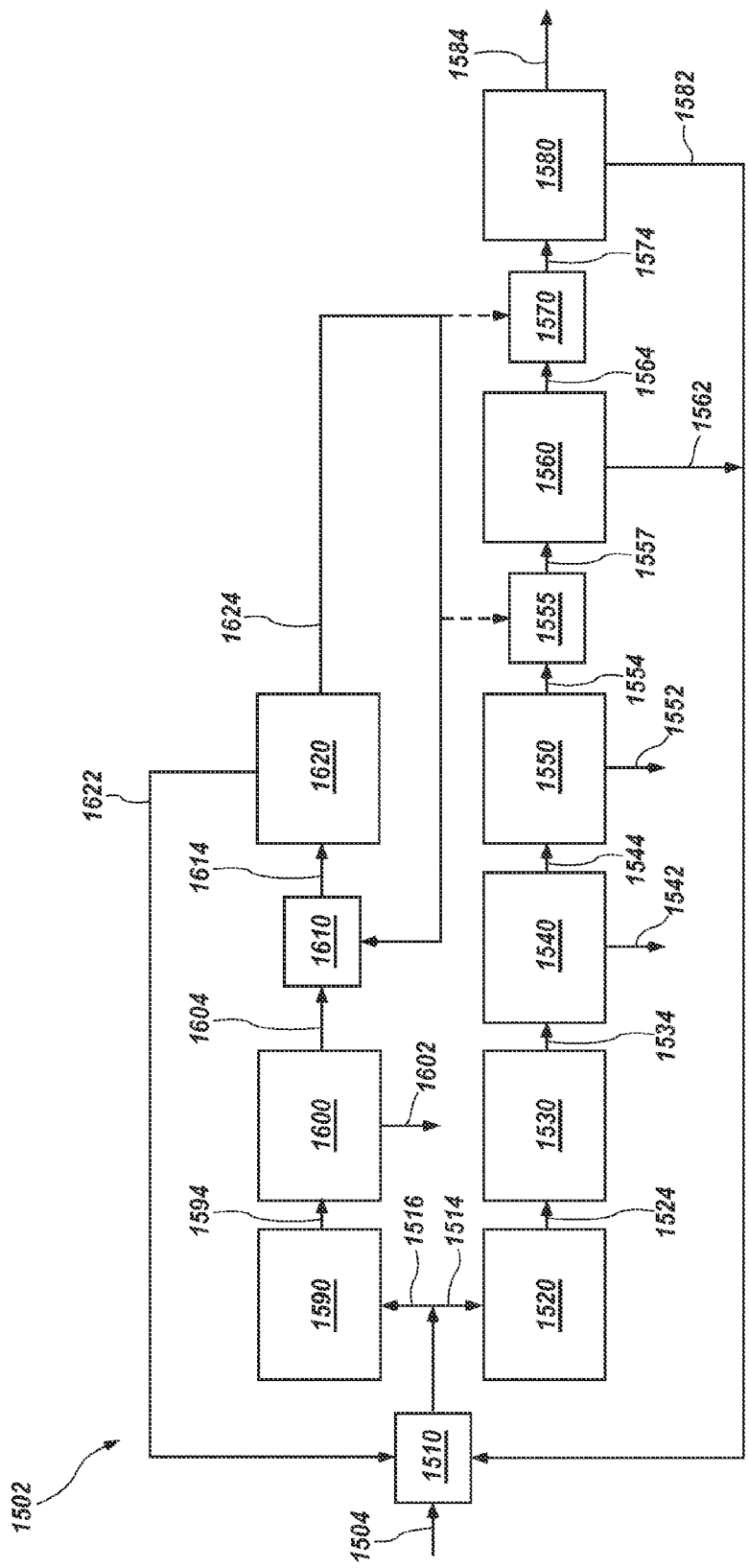

A process-flow diagram and system 1502 for this example are shown in FIG. 11. Example 9 is similar to Example 8, but without the formation of langbeinite.

Leach brine 1504 is mixed with recycle crystals 1562, 1582, and/or 1622 in a mixer 1510 to form liquors 1514, 1516. Each liquor 1514, 1516 enters one of two pre-concentrators 1520, 1590 operating at about 100° C. The pre-concentrators 1520, 1590 may be, for example, MVR evaporators. Though shown as two pre-concentrators 1520, 1590, in some embodiments, the liquors 1514, 1516 leaving the mixer 1510 enter a single pre-concentrator, and split after leaving the pre-concentrator. Furthermore, each pre-concentrator 1520, 1590 may include two or more individual units operable to remove water.

Liquor 1524 leaving the pre-concentrator 1520 enters an MEE (comprising pre-concentrator 1530 and crystallizers 1540, 1550, 1560, and 1580). The first evaporation stage operates at about 100° C., and each subsequent stage operates at a temperature approximately 12° C. lower than the previous stage. Water is evaporated from liquor 1524 in a pre-concentrator 1530 (i.e., an effect of the MEE) operating at about 100° C. to form liquor 1534. Liquor 1534 enters an SOP crystallizer 1540 (i.e., a second MEE effect) operating at about 88° C. to form SOP crystals 1542 and liquor 1544. Liquor 1544 enters a crystallizer 1550 (i.e., a third MEE effect) operating at about 76° C. to form SOP crystals 1552 and liquor 1554. Liquor 1554 optionally enters a mixer 1555, where it may be mixed with a portion of liquor 1624 to form liquor 1557. Liquor 1557 enters a crystallizer 1560 (i.e., a fourth MEE effect) operating at about 64° C. to form recycle crystals 1562 and liquor 1564. The liquor 1564 is optionally mixed with a portion of liquor 1624 in a mixer 1570 to form liquor 1574. Liquor 1574 enters a crystallizer 1580 (i.e., a fifth MEE effect) operating at about 50° C. to form recycle crystals 1582 and liquor 1584. SOP crystals 1542 and 1552 are separated for drying, granulation, and/or sale. The liquor 1584 (which may be potassium-depleted) leaving the MEE is purged from the system 1502. Though two mixers 1555, 1570 are shown between MEE effects in FIG. 11, the process may operate with only one mixer or without any mixers. In general, the mixer 1555 or 1570 (if present) is disposed before the first stage in which recycle crystals are formed.

The parallel process includes MVR evaporators. Liquor 1594 leaving the pre-concentrator 1590 enters an SOP crystallizer 1600 (an MVR evaporator) operating at about 85° C. to form SOP crystals 1602 and liquor 1604. Liquor 1604 may be mixed with a portion of liquor 1624 in mixer 1610 to form liquor 1614. Liquor 1614 enters a crystallizer 1620 operating at about 70° C. to form recycle crystals 1622 and liquor 1624. SOP crystals 1602 are separated for drying, granulation, and/or sale, and may be combined with SOP crystals 1542 and/or 1552 formed in the MEE. The liquor 1624 leaving the crystallizer 1620 is recycled to the mixer 1610, and/or transferred to the MEE process via mixer 1570. The liquor 1584 purged from the MEE may be further processed and/or disposed of.

Example 10

Figure 12:
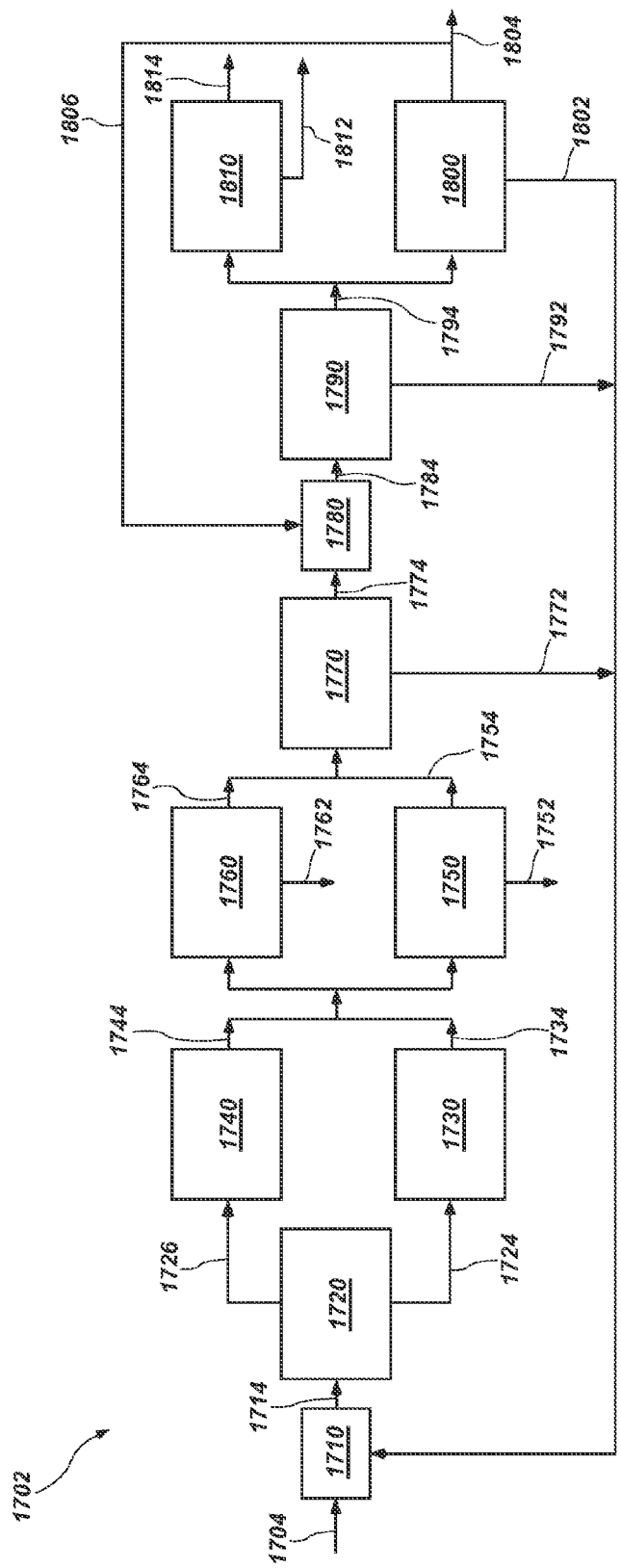

Multiple-Effect Evaporation (MEE) Stages Optionally in Parallel with Mechanical Vapor Recompression (MVR) Stages A process-flow diagram and system 1702 for this example are shown in FIG. 12. Leach brine 1704 is mixed with recycle crystals 1772, 1792, and/or 1802 in a mixer 1710 to form liquor 1714. The liquor 1714 enters a pre-concentrator 1720 (e.g., an MVR evaporator) operating at about 100° C. Though shown as one pre-concentrator 1720, in some embodiments, the pre-concentrator 1720 may include two or more individual units operable in series or in parallel to remove water.

Liquor 1724 leaving the pre-concentrator 1720 enters a pre-concentrator 1730, comprising the first evaporation stage of an MEE, operating at about 100° C. Liquor 1726 also leaves the pre-concentrator 1720, and is split from liquor 1724 by a splitter (not shown). Liquor 1726 enters a pre-concentrator 1740, comprising an MVR evaporator, operating at about 100° C. Liquors 1734 and 1744 form in the pre-concentrators 1730 and 1740, respectively. Liquors 1734 and 1744 may have the same or different compositions. In some embodiments, the operating conditions of one or both pre-concentrators 1730 and 1740 may vary based on the volume, temperature, and/or composition of the leach brine 1704. For example, the pre-concentrator 1730 may be operated at a constant flow, and the pre-concentrator 1740 may have a variable flow to accommodate changes in the flow of the leach brine 1704.

Liquors 1734 and 1744 may be combined in a mixer (not shown) and/or split in a splitter (not shown) before entering crystallizers 1750 and 1760. Crystallizer 1750 is a second MEE effect operating at about 88° C. to form SOP crystals 1752 and liquor 1754. Crystallizer 1760 is an MVR evaporator operating at about 88° C. to form SOP crystals 1762 and liquor 1764. Liquors 1754 and 1764 may have the same or different compositions. In some embodiments, the operating conditions of one or both crystallizers 1750 and 1760 vary based on the volume, temperature, and/or composition of the liquors 1734 and 1744. For example, the crystallizer 1750 may be operated at a constant flow, and the crystallizer 1760 may have a variable flow to accommodate changes in the flow of the liquors 1734 and 1744. In some embodiments, the liquor 1734 passes entirely to the crystallizer 1750, and the liquor 1744 passes entirely to the crystallizer 1760, without any mixing thereof.

Liquors 1754 and 1764 may be mixed in a mixer (not shown) before entering a crystallizer 1770 (i.e., a third MEE effect). The crystallizer 1770 operates at about 76° C. to form recycle crystals 1772 and liquor 1774. Liquor 1774 is mixed with a recycle liquor 1806 (e.g., a potassium-depleted liquid) in a mixer 1780 to form liquor 1784. Liquor 1784 enters a crystallizer 1790 (i.e., a fourth MEE effect) operating at about 64° C. to form recycle crystals 1792 and liquor 1794. The liquor 1794 is divided into two portions in a splitter (not shown) before entering each of crystallizers 1800 and 1810.

Crystallizer 1800 is a fifth MEE effect operating at about 50° C. to form recycle crystals 1802 and liquor 1804. The recycle liquor 1806 is separated from the liquor 1804 by a splitter (not shown). Crystallizer 1810 is an MVR evaporator operating at about 100° C. to form langbeinite crystals 1812 and liquor 1814. In some embodiments, the operating conditions of one or both crystallizers 1800 and 1810 may vary based on the volume, temperature, and/or composition of the liquors 1754 and 1764. For example, the crystallizer 1800 may be operated at a constant flow, and the crystallizer 1810 may have a variable flow to accommodate changes in the flow of the liquors 1754 and 1764. In some embodiments, the flow through crystallizers 1800 and 1810 may vary based on market conditions (e.g., demand for SOP versus demand for langbeinite).

The product output of Example 10 may be varied, such as to maximize economic value, by varying the amount of the liquor entering each of the MEE stages and MVR evaporators, for stages in which the liquor is split. MVR evaporators may be powered by variable frequency drives, which allow a wide range of operation, such that MEE stages may operate under nearly constant conditions.

Example 11

Figure 13:
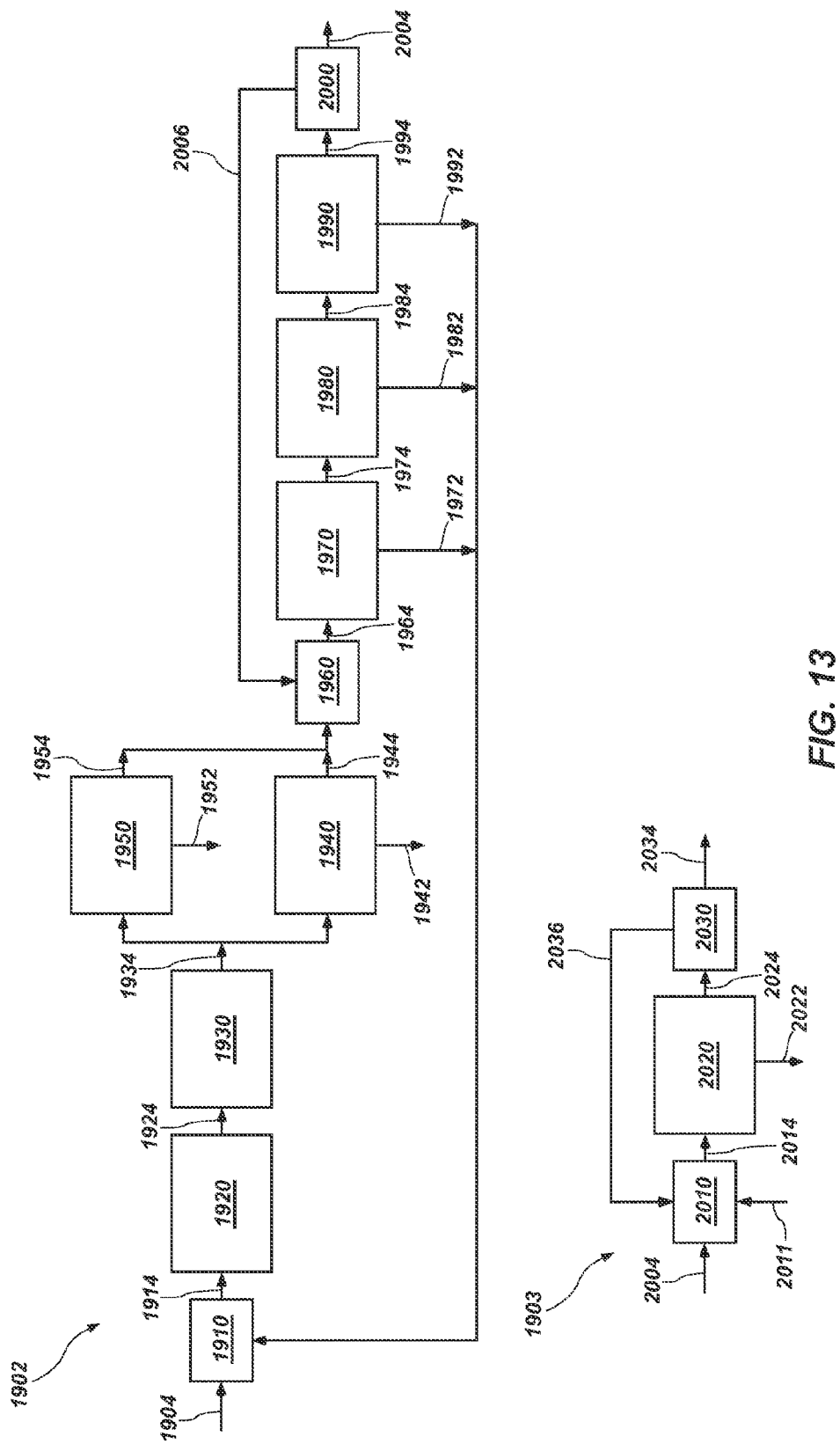

Multiple-Effect Evaporation (MEE) in Parallel with Mechanical Vapor Recompression (MVR); Separate Langbeinite Crystallization A process-flow diagram and system 1902 for this example are shown in FIG. 13. Approximately 1654 tons per hour (TPH) of leach brine 1904 is mixed with approximately 379.6 TPH of leonite crystals 1972, 1982, and/or 1992 in a mixer 1910 to form approximately 2033 TPH of liquor 1914. The leach brine 1904 includes about 6.50 g $K_2SO_4$ per 100 g $H_2O$ (about 6.71 moles of potassium sulfate per 1,000 moles of water) and about 4.49 g $MgSO_4$ per 100 g $H_2O$ (about 6.71 moles of magnesium sulfate per 1,000 moles of water). The leonite crystals 1972, 1982, and/or 1992 combined include about 180.4 TPH of $K_2SO_4$, about 124.6 TPH of $MgSO_4$, and about 74.53 TPH of water. Water is evaporated from the liquor 1914 in a pre-concentration evaporator 1920 (e.g., an MVR evaporator, an MEE stage, any combination thereof, etc.) operating at about 100° C. to foam liquor 1924. Liquor 1924 enters a second pre-concentration evaporator 1930 (e.g., an MVR evaporator, an MEE stage, any combination thereof, etc.) operating at about 100° C. to form liquor 1934. The pre-concentration evaporators 1920, 1930 can also be operated in series. Regardless of the configuration, one of the pre-concentration evaporators 1920, 1930 is the first effect of an MEE. Together, the pre-concentration evaporators 1920, 1930 evaporate approximately 428.2 TPH of water. The compositions of the materials entering and leaving the mixer 1910, the pre-concentration evaporators 1920, 1930 are as shown in Table 5 below.

TABLE 5

| | Leach brine 1904 | Crystals 1972, 1982, & 1992 | Liquor 1914 | Liquor 1934 |
|---|---|---|---|---|
| g $K_2SO_4$ per 100 g $H_2O$ | 6.50 | — | 17.72 | 24.40 |
| g $MgSO_4$ per 100 g $H_2O$ | 4.49 | — | 12.24 | 16.86 |
| TPH $K_2SO_4$ | 96.85 | 180.44 | 277.3 | 277.3 |
| TPH $MgSO_4$ | 66.90 | 124.64 | 191.5 | 191.5 |
| TPH $H_2O$ | 1490 | 74.53 | 1565 | 1136 |
| TPH total | 1654 | 379.6 | 2033 | 1605 |

The pre-concentration evaporators 1920, 1930 facilitate forming a liquor 1934 having a concentration that remains approximately constant with time. That is, if the composition of the leach brine 1904 changes with time, the operating parameters of the pre-concentration evaporator 1920 and the pre-concentrator 1930 (e.g., heating loads, temperatures, pressures, etc.) may be controlled to maintain the liquor 1934 at a constant composition (i.e., unchanging with respect to time). Thus, control of subsequent operations may be simplified.

Liquor 1934 is split into two or more streams in a splitter (not shown), each entering a crystallizer 1940 or 1950, which operate in parallel, but can also be configured to operate in series. The crystallizer 1940 is a second effect of the MEE operating at about 85° C., wherein SOP crystals 1942 are formed and removed to form liquor 1944. The crystallizer 1950 is an MVR evaporator operating at about 85° C., wherein SOP crystals 1952 are formed and removed to form liquor 1954. Together, the crystallizers 1940, 1950 evaporate about 382.8 TPH of water to form about 87.56 TPH of SOP crystals 1942, 1952 (which equals approximately 90.4% of the $K_2SO_4$ in the leach brine 1904). The SOP crystals 1942 and 1952 may be combined, washed, dried, granulated, and/or sold. Liquors 1944, 1954 (totaling about 1135 TPH) are combined in a mixer 1960 with a portion 2006 (about 127.9 TPH) of liquor 1994 to form about 1263 TPH of liquor 1964. The portion 2006 of liquor 1994 is potassium-depleted, increasing the relative concentration of magnesium with respect to potassium, such that the liquor 1964 is at a point on the phase diagram that results in crystallizing leonite in a subsequent crystallizer 1970. The compositions of the materials entering and leaving the crystallizers 1940, 1950 and the mixer 1960 are as shown in Table 6 below.

TABLE 6

| | Liquor 1934 | Total of Liquors 1944, 1954 | Portion 2006 of Liquor 1994 | Liquor 1964 |
|---|---|---|---|---|
| g $K_2SO_4$ per 100 g $H_2O$ | 24.40 | 25.18 | 6.78 | 23.37 |
| g $MgSO_4$ per 100 g $H_2O$ | 16.86 | 25.42 | 48.83 | 27.72 |
| TPH $K_2SO_4$ | 277.3 | 189.7 | 5.57 | 195.3 |
| TPH $MgSO_4$ | 191.5 | 191.5 | 40.14 | 231.7 |
| TPH $H_2O$ | 1136 | 753.6 | 82.21 | 835.8 |
| TPH total | 1605 | 1135 | 127.9 | 1263 |

Liquor 1964 enters the crystallizer 1970 (a third effect) operating at about 74° C., wherein leonite crystals 1972 are formed and removed to form liquor 1974. Liquor 1974 enters a crystallizer 1980 (a fourth effect) operating at about 62° C., wherein leonite crystals 1982 are formed and removed to form liquor 1984. Liquor 1984 enters a crystallizer 1990 (a fifth effect) operating at about 50° C., wherein leonite crystals 1992 are formed and removed to form approximately 341.1 TPH of liquor 1994. A splitter 2000 divides the liquor 1994 into portions 2004 (approximately 213.2 TPH) and 2006 (approximately 127.9 TPH), and portion 2004 is removed from the system 1902 to a system 1903 for langbeinite production. Portion 2006 is recycled to the mixer 1960. The crystallizers 1970, 1980, and 1990 together form a recycle crystallizer system, removing approximately 542.0 TPH of water and forming approximately 379.6 TPH of leonite crystals 1972, 1982, and 1992. The compositions of the materials entering and leaving the recycle crystallizer system are as shown in Table 7 below.

TABLE 7

| | Liquor 1964 | Crystals 1972, 1982, & 1992 | Liquor 1994 | Portion 2004 of Liquor 1994 | Portion 2006 of Liquor 1994 |
|---|---|---|---|---|---|
| g $K_2SO_4$ per 100 g $H_2O$ | 23.37 | — | 6.78 | 6.78 | 6.78 |
| g $MgSO_4$ per 100 g $H_2O$ | 27.72 | — | 48.83 | 48.83 | 48.83 |
| TPH $K_2SO_4$ | 195.3 | 180.4 | 14.86 | 9.29 | 5.57 |
| TPH $MgSO_4$ | 231.7 | 124.6 | 107.0 | 66.90 | 40.14 |
| TPH $H_2O$ | 835.8 | 74.53 | 219.2 | 137.01 | 82.21 |
| TPH total | 1263 | 379.6 | 341.1 | 213.2 | 127.9 |

The recycle crystallizer system produces an amount of leonite and/or schoenite crystals 1972, 1982, and 1992 sufficient to remove most of the potassium from the solution (e.g., at least 80%, at least 90% or at least 95% of the $K_2SO_4$ entering from the leach brine 1904). Thus, the amount of potassium leaving in the portion 2004 of the liquor 1994 may be minimized.

Langbeinite is formed in a separate system 1903, decoupled from the MEE of system 1902. Portion 2004 (approximately 213.2 TPH) of liquor 1994 is mixed with approximately 10.77 TPH of SOP 2011 and approximately 84.15 TPH of a recycle stream 2036 in a mixer 2010 to form approximately 308.1 TPH of liquor 2014. The amount of SOP 2011 added to the portion 2004 of liquor 1994 is based upon the targeted langbeinite production rate (e.g., magnesium and potassium may be present in a molar ratio greater than or equal to 2:1 in the liquor 2014). Langbeinite is formed from the liquor 2014. The SOP 2011 may be a portion of one or both of SOP crystals 1942 or 1952 formed in the system 1902 for producing SOP. Liquor 2014 enters a crystallizer 2020, which may be an evaporator (e.g., single-effect evaporator, MEE, MVR evaporator, etc.) configured to remove approximately 48.24 TPH of water, forming approximately 35.49 TPH of langbeinite 2022 and approximately 224.4 TPH liquor 2024. The crystallizer 2020, or a portion thereof, operates at a temperature of about 85° C. The langbeinite 2022 is separated from liquor 2024 for drying, granulation, and/or sale, and a splitter 2030 divides the liquor 2024 into a purge stream 2034 (approximately 140.2 TPH) and the recycle stream 2036. The recycle stream 2036 is recycled to the mixer 2010. The purge stream 2034 is removed from the system 1903 for treatment or disposal (e.g., as tailings). The compositions of the material flows within the system 1903 are as shown in Table 8 below.

TABLE 8

|  | Portion 2004 of Liquor 1994 | Recycle stream 2036 | Liquor 2014 | Liquor 2024 | Purge stream 2034 |
| --- | --- | --- | --- | --- | --- |
| g $K_2SO_4$ per 100 g $H_2O$ | 6.78 | 5.81 | 12.17 | 5.81 | 5.81 |
| g $MgSO_4$ per 100 g $H_2O$ | 48.83 | 52.17 | 49.77 | 52.17 | 52.17 |
| TPH $K_2SO_4$ | 9.29 | 3.09 | 23.15 | 8.25 | 5.16 |
| TPH $MgSO_4$ | 66.90 | 27.79 | 94.69 | 74.10 | 46.31 |
| TPH $H_2O$ | 137.01 | 53.26 | 190.3 | 142.0 | 88.77 |
| TPH total | 213.2 | 84.15 | 308.1 | 224.4 | 140.2 |

Since approximately 10.77 TPH of SOP 2011 is used as an input to the system 1903 for langbeinite production, the net production of SOP from the systems 1902, 1903 is about 76.79 TPH, or about 79.3% of the $K_2SO_4$ in the leach brine 1904. However, 35.49 TPH of langbeinite 2022 includes another 14.9 TPH of $K_2SO_4$, for a total $K_2SO_4$ recovery of about 91.69 TPH (about 94.67%). The langbeinite 2022 (35.49 TPH) also includes about 20.59 TPH of $MgSO_4$, for a total $MgSO_4$ recovery of about 30.77%. The systems 1902, 1903 remove approximately 1401 TPH of water by evaporation.

In some embodiments, some or all of the portion 2004 of the liquor 1994 leaving the crystallizer 1990 is sent to tailings or used to form kieserite and/or epsomite. Additional crystallization may be necessary to form kieserite or epsomite (e.g., additional potassium may be removed from the portion 2004 of the liquor 1994 before forming kieserite or epsomite).

In other embodiments, the entire portion 2004 of the liquor 1994 leaving the crystallizer 1990 is processed in the system 1903 to increase SOP recovery. That is, the portion 2004 of the liquor 1994 has a slightly higher percentage of SOP than the liquor 2024 leaving the crystallizer 2020.

Operating conditions for SOP production (i.e., in system 1902) may be held constant regardless of langbeinite requirements. By making SOP and langbeinite separately, the production amounts of each may be varied with minimal impact to the production process (e.g., to temperatures, flow rates, power and heating loads, etc.). Variation of langbeinite production requires adjustment to operating conditions of the separate langbeinite process (i.e., in system 1903) and adjustment of the amount of SOP used as an input to the langbeinite process.

One advantage of the embodiment of Example 11, as described above and shown in FIG. 13, is that energy use may be balanced between steam and electricity. The energy may be balanced on a stand-alone basis, may be coupled with the energy demands for the rest of the on-site facilities, or may be varied based on production rates and product ratios. This allows co-generation to be a workable option for this processing scenario. In addition, this processing scenario allows for flexibility in processing langbeinite or other secondary products without influencing the evaporative loads or the operation of equipment related to the manufacture of SOP.

While the disclosure is susceptible to various modifications and alternative forms, specific embodiments have been shown by way of example in the drawings and have been described in detail herein. However, the disclosure is not intended to be limited to the particular forms disclosed. Rather, the disclosure is to cover all modifications, equivalents, and alternatives falling within the scope of the disclosure as defined by the following appended claims and their legal equivalents. In addition, features from one embodiment may be combined with features of another embodiment while still being encompassed within the scope of the present disclosure as contemplated by the inventors. Further, embodiments of the present disclosure have utility in the processing of various materials.

What is claimed is:

1. A method of processing an aqueous solution comprising potassium sulfate and magnesium sulfate, the method comprising:
    mixing recycle crystals with the aqueous solution to form a first concentrate, the first concentrate having a higher concentration of potassium sulfate and magnesium sulfate than the aqueous solution;
    crystallizing $K_2SO_4$ from at least a portion of the first concentrate to form a second concentrate; and
    crystallizing the recycle crystals from at least a portion of the second concentrate to recover $K_2SO_4$ and to form a potassium-depleted solution.

2. The method of claim 1, further comprising purging at least a portion of the potassium-depleted solution.

3. The method of claim 1, further comprising mixing a portion of the potassium-depleted solution with a portion of the second concentrate.

4. The method of claim 1, further comprising crystallizing langbeinite from at least a portion of the potassium-depleted solution.

5. The method of claim 4, wherein crystallizing langbeinite from at least a portion of the potassium-depleted solution comprises maintaining the at least a portion of the potassium-depleted solution within a temperature range from about 70° C. to about 115° C.

6. The method of claim 5, wherein crystallizing langbeinite from at least a portion of the potassium-depleted solution comprises maintaining the at least a portion of the potassium-depleted solution within a temperature range from about 85° C. to about 100° C.

7. The method of claim 4, wherein crystallizing langbeinite from at least a portion of the potassium-depleted solution comprises varying the production rate of langbeinite.

8. The method of claim 7, wherein varying the production rate of langbeinite comprises alternately operating in at least two operating modes, wherein $K_2SO_4$ is formed in a first operating mode, and $K_2SO_4$ and langbeinite are each formed simultaneously in a second operating mode.

9. The method of claim 4, wherein crystallizing langbeinite from at least a portion of the potassium-depleted solution comprises forming a second potassium-depleted solution, and further comprising mixing at least a portion of the second potassium-depleted solution with $K_2SO_4$.

10. The method of claim 1, further comprising dividing the first concentrate into a plurality of portions and crystallizing $K_2SO_4$ from at least one of the portions of the first concentrate.

11. The method of claim 10, further comprising crystallizing langbeinite from at least one of the portions of the first concentrate.

12. The method of claim 10, wherein crystallizing $K_2SO_4$ from at least one of the portions of the first concentrate comprises separately crystallizing $K_2SO_4$ from each of the plurality of portions of the first concentrate.

13. The method of claim 1, further comprising removing water from the second concentrate to form a more concentrated second concentrate before crystallizing $K_2SO_4$ from the more concentrated second concentrate.

14. The method of claim 1, wherein crystallizing the recycle crystals from at least a portion of the second concentrate comprises sequentially evaporating a plurality of portions of water to recover potassium.

15. The method of claim 1, further comprising recycling a portion of the potassium-depleted solution to mix with at least a portion of the second concentrate.

16. A system for processing potassium sulfate and magnesium sulfate, the system comprising:
a first crystallizer structured and adapted to precipitate potassium sulfate from a concentrated liquor; and
a second crystallizer in fluid communication with the first crystallizer, the second crystallizer structured and adapted to precipitate recycle crystals from the concentrated liquor to form a potassium-depleted recycle brine;
wherein at least a portion of the recycle crystals precipitated in the second crystallizer is configured to be recycled to the first crystallizer.

17. The system of claim 16, further comprising a concentrating apparatus structured and adapted to evaporate water from the aqueous solution to form the concentrated liquor, the concentrating apparatus in fluid communication with the first crystallizer and the first mix tank.

18. The system of claim 16, further comprising a second mix tank in fluid communication with the first crystallizer and the second crystallizer, the second mix tank structured and adapted to mix a potassium-depleted recycle brine with the concentrated liquor before the concentrated liquor enters the second crystallizer.

19. The system of claim 16, wherein:
the first crystallizer comprises at least one of a mechanical-vapor-recompression evaporator and a multiple-effect evaporator structured and adapted to operate at a temperature in a range from about 85° C. to about 100° C.; and
the second crystallizer comprises three or more multiple-effect evaporator stages operating in series, wherein at least one of the multiple-effect evaporator stages is structured and adapted to precipitate leonite crystals from the concentrated liquor.

20. The system of claim 16, wherein the plurality of multiple-effect evaporator stages comprises a first multiple-effect evaporator stage and a second multiple-effect evaporator stage, the first multiple-effect evaporator stage structured and adapted to operate at a temperature in a range from about 65° C. to about 75° C., and the second multiple-effect evaporator stage structured and adapted to operate at a temperature in a range from about 55° C. to about 65° C.

21. The system of claim 16, further comprising a third crystallizer in fluid communication with the second crystallizer, the third crystallizer structured and adapted to precipitate langbeinite crystals from the portion of the potassium-depleted brine to form a second potassium-depleted brine.

22. The system of claim 21, further comprising a third mix tank in fluid communication with the second crystallizer and the third crystallizer, the third mix tank structured and adapted to mix potassium sulfate with a portion of the potassium-depleted brine.

23. The system of claim 22, further comprising:
a splitting apparatus structured and adapted to divide the second potassium-depleted brine into a plurality of portions;
wherein the third mix tank is structured and adapted to mix a portion of the second potassium-depleted brine with the potassium sulfate and the portion of the potassium-depleted brine.

* * * * *

UNITED STATES PATENT AND TRADEMARK OFFICE
CERTIFICATE OF CORRECTION

Page 1 of 1

PATENT NO.         : 8,802,048 B2
APPLICATION NO.    : 14/023347
DATED              : August 12, 2014
INVENTOR(S)        : Steven L. Chastain et al.

It is certified that error appears in the above-identified patent and that said Letters Patent is hereby corrected as shown below:

On the title page:
item (71) Applicant, first line,    change "Intercontinental Potash Corporation," to --Intercontinental Potash Corp. (USA),--

In the specification:

COLUMN 1, LINE 53, change "($K_2SO_4MgSO_4.4H_2O$)," to --($K_2SO_4MgSO_4•4H_2O$),--

COLUMN 1, LINE 53, change "($K_2SO_4MgSO_4.6H_2O$)," to --($K_2SO_4MgSO_4•6H_2O$),--

COLUMN 1, LINE 54, change "($K_2SO_4.2MgSO_4$)," to --($K_2SO_4•2MgSO_4$),--

COLUMN 1, LINE 54, change "($MgSO_4.H_2O$)," to --($MgSO_4•H_2O$),--

COLUMN 1, LINE 55, change "($MgSO_4.7H_2O$)," to --($MgSO_4•7H_2O$),--

In the claims:
CLAIM 16, COLUMN 25, LINE 36,   change "liquor; and" to --liquor;--

CLAIM 16, COLUMN 25, LINE 40,   change "brine;" to --brine; and--

CLAIM 16, COLUMN 25, LINE 41,   change "wherein" to --a first mix tank structured and adapted to mix an aqueous solution with the recycle crystals, the first mix tank in fluid communication with the first crystallizer; wherein--

CLAIM 20, COLUMN 26, LINE 20,   change "claim 16," to --claim 19,--

Signed and Sealed this
Eighteenth Day of August, 2015

Michelle K. Lee
*Director of the United States Patent and Trademark Office*